(12) United States Patent
Park et al.

(10) Patent No.: US 9,426,043 B2
(45) Date of Patent: Aug. 23, 2016

(54) METHOD FOR REGISTERING AND PROVIDING NOTICE OF A TRAP EVENT, AND TERMINAL USING SAME

(75) Inventors: Seungkyu Park, Anyang-si (KR); Younsung Chu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 478 days.

(21) Appl. No.: 13/979,804

(22) PCT Filed: Jan. 27, 2012

(86) PCT No.: PCT/KR2012/000625
§ 371 (c)(1),
(2), (4) Date: Jul. 15, 2013

(87) PCT Pub. No.: WO2012/102566
PCT Pub. Date: Aug. 2, 2012

(65) Prior Publication Data
US 2013/0297789 A1    Nov. 7, 2013

Related U.S. Application Data

(60) Provisional application No. 61/436,972, filed on Jan. 27, 2011, provisional application No. 61/527,622, filed on Aug. 26, 2011, provisional application No. 61/470,491, filed on Apr. 1, 2011.

(51) Int. Cl.
*G06F 15/16* (2006.01)
*G06F 15/173* (2006.01)
(Continued)

(52) U.S. Cl.
CPC ............ *H04L 43/00* (2013.01); *H04L 41/0681* (2013.01); *H04L 41/28* (2013.01);
(Continued)

(58) Field of Classification Search
CPC ............................ H04L 43/00; H04L 41/0681
USPC ............................................................ 709/224
See application file for complete search history.

(56) References Cited

U.S. PATENT DOCUMENTS 6,536,037 B1 * 3/2003 Guheen ..................... G06F 8/71
703/2
6,990,518 B1 * 1/2006 Secer ................... H04L 41/0681
709/203

(Continued)

FOREIGN PATENT DOCUMENTS

CN          1889741         1/2007
KR    10-2009-0001410       1/2009

OTHER PUBLICATIONS

Korean Intellectual Property Office Application Serial No. 10-2013-7017507, Office Action dated Feb. 16, 2015, 4 pages.
(Continued)

*Primary Examiner* — Melvin H Pollack
(74) *Attorney, Agent, or Firm* — Lee Hong Degerman Kang & Waimey; Jonathan Kang; Jeffrey Lotspeich

(57) ABSTRACT

Provided is a method for notifying a trap to other functional components. The method includes receiving a trap register request from a server, wherein the trap register request includes a target identifier; checking whether the server has a permission to execute an executable node indicated by the target identifier; registering a trap if the server has the permission to execute the executable node, wherein the trap includes a trap event and is associated with a server identifier and a trap identifier; detecting the trap; checking whether a server identified by the server identifier has the permission to execute the executable node; and notifying the executable node of the trap if the server identified by the server identifier has the permission execute the executable node.

11 Claims, 20 Drawing Sheets

(51) Int. Cl.
*H04L 12/26* (2006.01)
*H04L 29/06* (2006.01)
*H04W 12/12* (2009.01)
*H04W 4/00* (2009.01)
*H04L 12/24* (2006.01)

(52) U.S. Cl.
CPC ......... *H04L 63/101* (2013.01); *H04L 63/1491* (2013.01); *H04W 4/001* (2013.01); *H04W 12/12* (2013.01); *H04L 41/0813* (2013.01)

(56) References Cited

U.S. PATENT DOCUMENTS

| | | | | |
|---|---|---|---|---|
| 7,082,464 B2 * | 7/2006 | Hasan | ................. | H04L 41/0213 709/202 |
| 7,099,947 B1 * | 8/2006 | Nadeau | ............... | H04L 12/4641 709/229 |
| 7,200,651 B1 * | 4/2007 | Niemi | ...................... | G06F 8/65 709/223 |
| 7,328,260 B1 * | 2/2008 | Muthiyan | .......... | H04L 41/0681 709/220 |
| 7,711,816 B2 * | 5/2010 | Liu | ..................... | H04L 41/0213 370/254 |
| 7,991,856 B2 * | 8/2011 | Takizawa | ................ | H04L 12/24 705/51 |
| 8,001,231 B2 * | 8/2011 | He | ...................... | H04L 41/0681 709/223 |
| 8,166,403 B2 * | 4/2012 | Torii | .................. | H04L 41/0213 709/222 |
| 8,249,848 B2 * | 8/2012 | Letz | ................... | G06F 17/5022 703/14 |
| 8,868,717 B2 * | 10/2014 | Kushwaha | ............ | H04L 41/046 709/217 |
| 8,880,578 B2 * | 11/2014 | Porel | .................. | H04L 41/0213 709/202 |
| 9,077,611 B2 * | 7/2015 | Cordray | ............. | H04L 41/0246 |
| 9,160,767 B2 * | 10/2015 | Keum | ................. | G06F 21/6272 |
| 2006/0212562 A1 | 9/2006 | Kushwaha et al. | | |
| 2007/0093243 A1 * | 4/2007 | Kapadekar | ........ | H04M 3/42178 455/419 |
| 2007/0136575 A1 | 6/2007 | Gutekunst | | |
| 2007/0207800 A1 * | 9/2007 | Daley | .................. | H04L 12/2602 455/425 |
| 2008/0065753 A1 * | 3/2008 | Rao | .................... | H04L 12/2602 709/223 |
| 2008/0163262 A1 | 7/2008 | He | | |
| 2008/0317006 A1 * | 12/2008 | Li | ........................... | H04L 12/24 370/352 |
| 2010/0121967 A1 | 5/2010 | Keum et al. | | |
| 2010/0199333 A1 * | 8/2010 | Keum | ..................... | H04L 12/24 726/4 |
| 2011/0047253 A1 * | 2/2011 | Bhat | ...................... | H04L 41/04 709/221 |
| 2012/0233319 A1 * | 9/2012 | Yang | .................. | H04L 41/0213 709/224 |

OTHER PUBLICATIONS

The State Intellectual Property Office of the People's Republic of China Application Serial No. 201280006886.X, Office Action dated Mar. 10, 2016, 7 pages.

* cited by examiner

METHOD FOR REGISTERING AND PROVIDING NOTICE OF A TRAP EVENT, AND TERMINAL USING SAME

CROSS-REFERENCE TO RELATED APPLICATIONS

This application is the National Stage filing under 35 U.S.C. 371 of International Application No. PCT/KR2012/000625, filed on Jan. 27, 2012, which claims the benefit of U.S. Provisional Application Ser. No. 61/436,972, filed on Jan. 27, 2011, U.S. Provisional Application Ser. No. 61/470,491, filed on Apr. 1, 2011, and U.S. Provisional Application Ser. No. 61/527,622, filed on Aug. 26, 2011, the contents of which are all hereby incorporated by reference herein in their entirety.

TECHNICAL FIELD

The present invention relates to a method for registering a trap event in a DM client and notifying occurrence of the trap event, and an end device using the same.

BACKGROUND ART

A representative technology for managing a portable end device may include a device management (DM) technology of an Open Mobile Alliance (OMA). A DM opens a bidirectional session between the DM server and a DM client, and sends and receives DM commands through the session to perform end device management. The DM client may start the session by Package 1 sent to the DM server in order to open the DM session, while when the DM server determines that the end device management is required, the DM server may request the DM session to the DM client by sending a DM notification called Package 0. When the DM client receives the DM notification from the DM server, the DM client sends Package 1 to the DM server to start the DM session.

Although the DM session is the bidirectional session, the DM commands that are sent and received through the DM session have an asymmetric characteristic. That is, the DM server may send all DM commands to the DM client, but the DM client may send a command of replacing device information (DevInfo)/device detail information (DevDetailInfo) of the DM server and results, and an only alert to the DM server.

The DM provides a user authorization framework based on challenge-credential. The framework provides a bidirectional authorization service in which the DM server and the DM client may authorize each other and allows various authorization mechanisms such as MD5, HTTP-Digest, basic authorization, and the like to be used. When the authorization method is used, a party that requests the authorization sends a challenge to the other party. Since the DM is the bidirectional authorization as described above, both the DM client and the DM server may send the challenge. The other party that receives the challenge needs to send its own credential information and receives the credential to authorize the other party.

The DM is one kind of framework for managing an end device and software management, event monitoring, locking function for security, and the like which are representatively discussed in management of a portable end device are handled by an additional management object (MO). A representative MO includes a software component management object (SCOMO) having a management function of software installed in the end device, a lock and wipe management object (LAWMO) that is capable of remotely locking and wiping a function of the end device, a software and application control management object (SACMO) that is capable of performing transaction by remotely configuring a process in the end device, a gateway management object (GwMO) that enables device management when the DM server and the DM client are disabled to be directly connected to each other due to a firewall and an NAT, and the like.

A representative MO which is not mentioned above may include a trap management object (TrapMO) and the TrapMO performs a function to monitor an event of a mobile device and report related information. A type of the monitoring event may include call setup failure, battery level, RF loss, memory usage level, DM account modified, external storage attached, S/W or H/W faults, and the like. The function to monitor and report a state of the end device is very useful and for example, a function to monitor the RF loss may be a great help in enhancing a coverage of a base station.

Respective trap events in the end device are distinguished with unique trap identification information (Trap ID). Herein, a trap may mean that a particular condition is imposed to detect an event which occurs in a program which is being executed. For example, the DM server needs to perform two steps of registration and notification in order to monitoring a specific trap event (trap_event1) of the DM client. The registration is the step in which the DM server requests monitoring registration to the DM client in order to monitor the specific event (trap_event1) and the notification is the step in which the DM client reports related information to the DM server when the corresponding event (trap_event1) occurs.

The TrapMO provides the function to monitor the event of the end device and the TrapMO may be divided into an inward type and an outward type depending on a reporting destination of event related information. The outward type trap is a trap that transfers, when a corresponding event occurs in the end device, information on the event which occurs to an external server of the end device. In this case, the external server may be a DM server itself that registers the trap event in the end device or a DM server of a third party. The inward type trap is a trap in which information on the trap event which occurs is transferred to not the external server but another component in the end device.

DISCLOSURE

Technical Problem

Embodiments disclosed in the specification are contrived to solve the aforementioned problems and an object is to provide a method that can compensate for a security weakness related to an inward trap and an outward trap of a TrapMO.

Technical Solution

To solve a technical issue, a method according to a first embodiment disclosed in the present specification, for controlling a trap operation of an end device for a trap notifying to other functional components, comprises the steps of: receiving a trap register request from a server, wherein the trap register request includes a trap identifier, a server identifier and a target identifier; checking whether the server has a permission to execute an executable node indicated by the target identifier associated with the trap identifier; registering a trap by storing the server identifier to be associated with the trap identifier if the server has the permission to execute the executable node, wherein the trap includes a trap event and is associated with the trap identifier; detecting the trap event;

checking whether a server identified by the stored server identifier has the permission to execute the executable node; and notifying the executable node of the trap event if the server identified by the stored server identifier has the authority to execute the executable node According to one example embodiment, in the step of checking whether the server identified by the stored server identifier has Exec permission on the executable node, it may be checked whether the server identified by the stored server identifier has Exec permission on the executable node based on an ACL (Access Control List)

According to one example embodiment, in the step of registering the trap comprises adding a sub-tree of a trap associated with the trap identifier. wherein the sub-tree may include a target identifier indicating an executable node, and the server identifier According to one example embodiment, wherein in the step of checking whether the server has Exec permission on an executable node pointed by the target identifier associated with the trap identifier, it may be checked whether the server has Add permission to create the sub-tree as well as the Exec permission.

According to one example embodiment, the method may further comprise transmitting a message indicating a registration failure to the server if the server does not have the Exec permission on the executable node.

According to one example embodiment, the method may further comprise deregistering the trap if the server identified by the stored server identifier does not have Exec permission on the executable node.

According to one example embodiment, the method may further comprise transmitting a message indicating that the trap has been deregistered to the server identified by the server identifier.

Meanwhile, to solve a technical issue, an end device according to a first embodiment disclosed in the present specification, may comprise: a transceiver configured to receive a trap registration request from a server, wherein the trap registration request includes a trap identifier, a server identifier and a target identifier; and a controller configured to check whether the server has Exec permission on an executable node pointed by the target identifier associated with the trap identifier, register a trap by storing the server identifier to be associated with the trap identifier if the server has Exec permission on the executable node. The trap may include a trap event and is associated with the trap identifier, wherein the controller is further configured to detect the trap event and check whether a server identified by the stored server identifier has Exec permission on the executable node. The transceiver may be further configured to notify the trap event to the executable node if the server identified by the stored server identifier has Exec permission on the executable node.

Meanwhile, to solve a technical issue, a method for controlling trap operation of an end device for notifying the trap to a server according to a second embodiment disclosed in the present specification, may comprise: receiving a trap registration request from a server, wherein the trap registration request includes a trap identifier and a server identifier which the trap is notified to; checking whether the server identifier included in the registration request equals to an identifier of the server which has transmitted the trap registration request to the device; and registering a trap associated with the trap identifier containing a trap event if the server identifier included in the registration request equals to the identifier of the server which has transmitted the trap registration request to the device.

According to one example embodiment, the method may further comprise transmitting a message indicating a registration failure to the server which has transmitted the trap registration request if the server identifier included in the registration request does not equal to the server identifier of the server which has transmitted the trap registration request to the device Meanwhile, to solve a technical issue, a device for notifying a trap to a server according to a second embodiment disclosed in the present specification may comprise: a transceiver configured to receive a trap registration request from a server, wherein the trap registration request includes a trap identifier and a server identifier which the trap is notified to; and a controller configured to check whether the server identifier included in the registration request equals to an identifier of the server which has transmitted the trap registration request to the device and register a trap associated with the trap identifier containing a trap event if the server identifier included in the registration request equals to the identifier of the server which has transmitted the trap registration request to the device Advantageous Effects According to the present invention, it can be assured that a DM server has an appropriate authority with respect to a command executed by a result of event occurrence at the time of monitoring a specific event of an end device by using an inward trap.

Further, according to the present invention, although an ACL which is a runtime property of a DM tree is changed, the DM server can appropriateness by reflecting the ACL of the DM tree in which the executed command is changed to the end device by using the inward trap.

In addition, according to the present invention, when the DM server monitors the specific event of the end device by using the outward trap, a possibility that information of the event which occurs will be abused for a DoS attack can be reduced.

In addition, according to the present invention, when the DM server monitors the specific event of the end device by using the outward trap, the information of the event which occurs can be prevented from being transferred to an undesired DM server.

MODE FOR INVENTION

Hereinafter, embodiments of the present invention will be described in detail with reference to the accompanying drawings.

Figure 1:
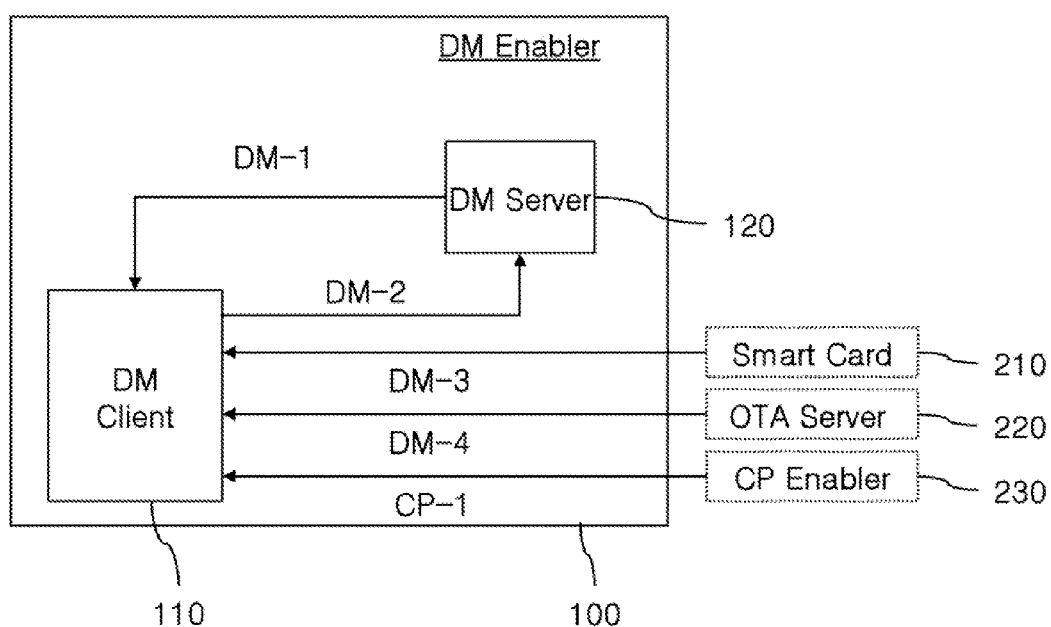
FIG. 1 is a diagram illustrating a device management architecture according to embodiments disclosed in the specification.

FIG. 1 is a diagram illustrating a device management architecture according to embodiments disclosed in the specification.

Device management (DM) is performed by a DM enabler 100 including a DM client 110 and a DM server 120.

The DM client 110 is an abstractive software component that follows a requirement of the DM client specified in an open mobile alliance (OMA) device management enabler.

The DM server 120 is an abstractive software component that follows a requirement of the DM server specified in the OMA device management enabler.

A client-server notification DM-1 provides an interface that enables the servers 120 to send a device management notification. The client-server notification DM-1 is an intermediate carrier and an interface that may be operated through a lot of protocols such as a WAP push and an SIP push.

A device management client-server protocol DM-2 provides an interface in which the servers 120 may transmit device management commands to the clients 110 and the clients 110 may transmit a state and an alarm to the servers 120. The device management client-server protocol DM-2 is an intermediate carrier and an interface that provides a lot of standardized bindings including an HTTP and an HTTPS. The interface is exposed through a radio connection-based data transfer protocol (for example, a general packet radio service (GPRS)) in order to provide wireless communication (over-the-air) device management performance.

The DM client 110 may be initially supplied through a file on a smart card 210. The file includes a series of DM commands for setting or changing a setup in the DM client 110. A DM bootstrap profile DM-3 through the smart card 210 is a unidirectional interface which does not receive a feedback from the DM client 110. In a next substantial opportunity, the DM client 110 connected to the DM server 120 is a unique expectation result.

The DM client 110 may be initially supplied through a file transmitted by several push protocols. The file includes DM commands for setting or changing the setup in the DM client. A bootstrap profile OTA DM-4 is a unidirectional interface from an OTA server 220 to the DM client 110, which does not receive the feedback from the DM client 110. In a next substantial opportunity, the DM client 110 connected to the DM server 120 is a unique expectation result.

The DM client 110 may be initially supplied through a CP enabler 230. A CP bootstrap profile CP-1 is a unidirectional interface from the CP enabler 230 to the DM client 110, which does not receive the feedback from the DM client 110. In a next substantial opportunity, the DM client 110 connected to the DM server 120 is a unique expectation result.

Figure 2A:
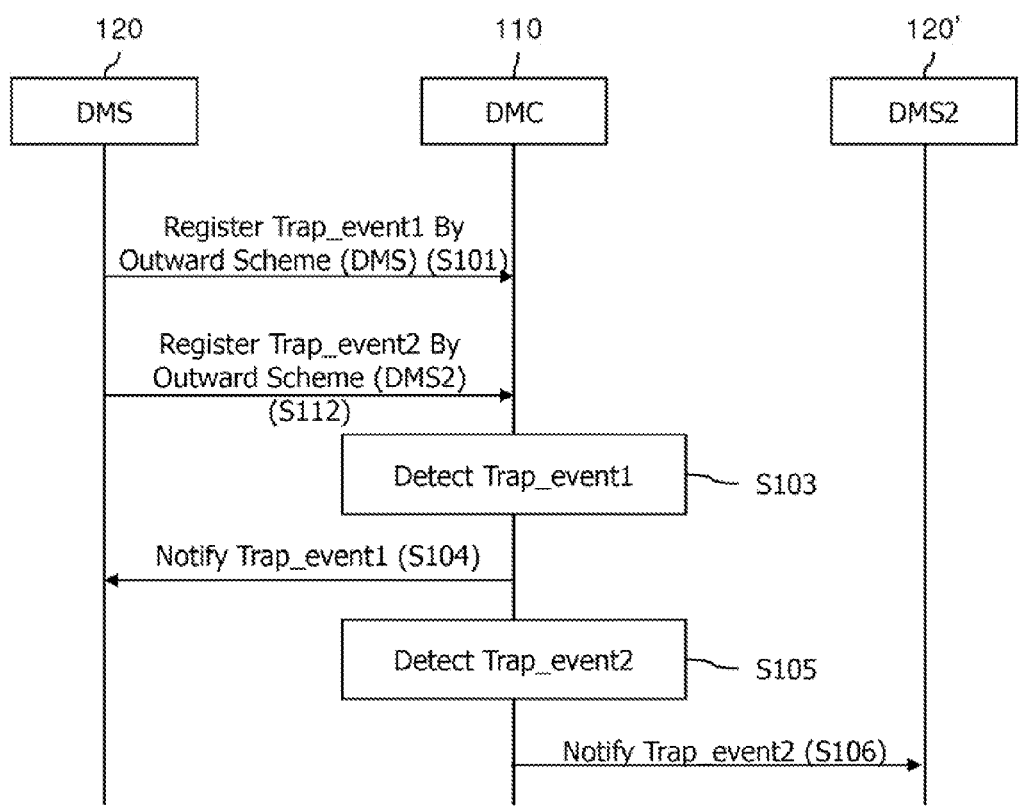
FIG. 2a is a flowchart exemplarily illustrating a process of monitoring an event of an outward trap in the related art.

FIG. 2a is a flowchart exemplarily illustrating a process of monitoring an event of an outward trap in the related art.

The DM server 120 registers a first trap event trap_event1 of the DM client 110 in the DM client 110 in order to monitor the first trap event trap_event1 of the DM client 110 (S101). Herein, the DM server 120 may register in the DM client 110 an outward type trap event to be sent to the DM server 120 itself that registers information regarding the event which occurs in the end device.

The DM server 120 also registers a second trap event trap_event2 of the DM client 110 in the DM client 110 in order to monitor the second trap event trap_event2 of the DM client 110 (S102). Herein, the DM server 120 may register in the DM client 110 the outward type trap event to be sent to a second DM server 120' itself that registers the information regarding the event which occurs in the end device.

The DM client 110 may monitor whether registered trap events are detected and sense that the first trap event trap_event1 occurs (S103).

The DM client 110 notifies the occurrence of the first trap event trap_event1 to the DM server 120 registered in the trap event (S104). In this case, the DM client 110 transfers related information to the DM server 120 through a generic alert and as the generic alert (Generic Alert), a meta type (Meta.Type), a meta format (Meta.Format), a source location URI (Source.LocURI), data (Data), and the like may be set. The Meta.Type is set as urn:oma:mo:diagmon:1.0:TrapNotification to represent that a generic alert message is a trap event notification, the meta format (Meta.Format) is represented by "chr", and the source location URI (Source.LocURI) represents an address of TargetServer/<x>/ServerID connected with the occurred trap event. Further, the data (Data) includes a trap identifier to notify a type of the occurred trap event.

The DM client 110 may continuously monitor whether the registered trap events are detected and sense that the second trap event trap_event2 occurs (S105).

The DM client 110 notifies the occurrence of the second trap event trap_event2 to the second DM server 120' registered in the trap event (S106). In this case, the DM client 110 transfers information related to the occurrence of the second trap event trap_event2 to the second DM server 120' through the generic alert (Generic Alert) and at this time, transfers other required information (the aforementioned meta type (Meta.Type), meta format (Meta.Format), source location URI (Source.LocURI), data (Data), and the like) together.

The DM server 120 monitors the event which occurs in the DM client 110 through the outward trap to send a monitoring result to the DM server 120 itself or another server.

Figure 2B:
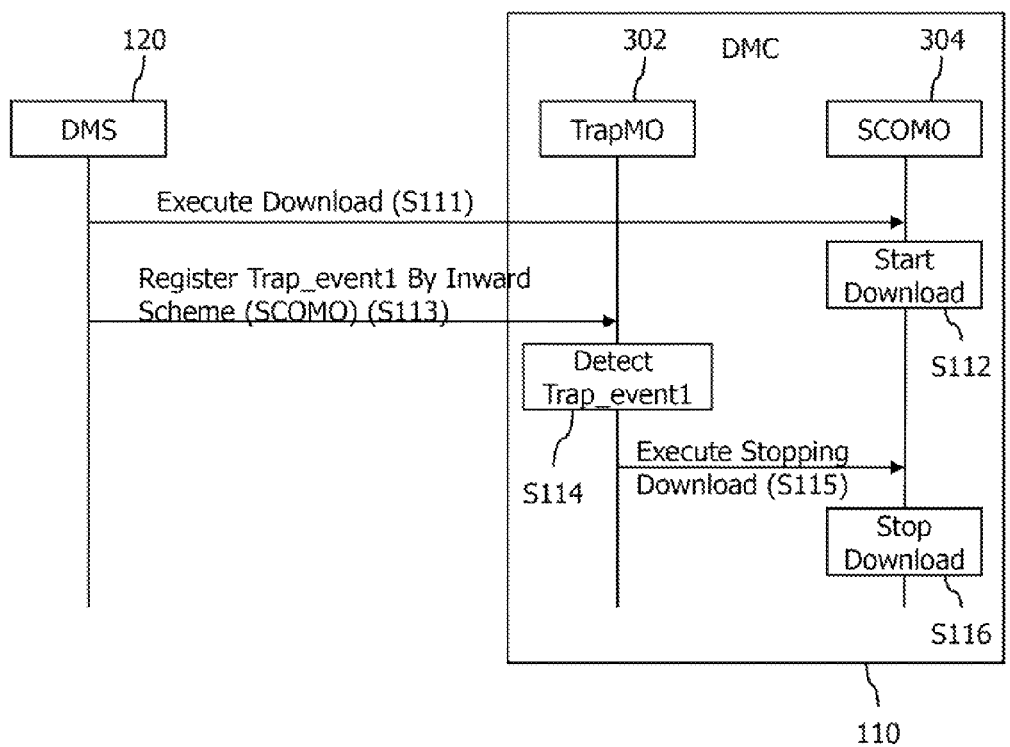
FIG. 2b is a flowchart exemplarily illustrating a process of monitoring an event of an inward trap in the related art.

FIG. 2b is a flowchart exemplarily illustrating a process of monitoring an event of an inward trap in the related art.

As described above, the inward trap is a trap that transfers a result of the occurred event to not the external DM server 120 like the outward trap but another internal functional component.

The DM server 120 sends a DM command to download a package PKG1 to a software component management object (SCOMO) 304 of the DM client 110 (S111). Herein, the DM command means transferring an execution command to a specific node (for example, 'SCOMO/Download/PKG1/Operations/Download').

The SCOMO 304 of the DM client 110 starts downloading the packet PKG1 according to the execution command received in step S111 from the DM server 120 (S112).

The DM server 120 registers the inward trap in a trap mobile object (TrapMO) 302 of the DM client 110 in order to automatically cancel a download process of the package PKG1 when the DM client 110 is in a low battery state (S113). As the inward trap is registered, the DM client 110 sends corresponding event information to a specific node (for example, 'SCOMO/Download/PKG1/Operations/Stop') when the trap event (trap)event1; Low_Battery) occurs.

The DM client 110 monitors the occurrence of the registered trap event and senses the occurrence of the trap event (trap_event1; Low_Battery) (S114).

The TrapMO 302 retrieves an inward notification registered in the event and sends the execution command to the corresponding node when the trap event (trap_event1; Low_Battery) occurs (S115). Herein, the corresponding node transfers the execution command to the DM client when the DM server 120 registers the inward trap and represents 'SCOMO/Download/PKG1/Operations/Stop' in the embodiment.

The SCOMO 304 receives the execution command from the TrapMO 302 to cancel the downloading of the package PKG1 (S116).

The DM server 120 transfers the information regarding the occurrence of the event to another component in the end device to perform appropriate processing depending on the occurrence of the event when the event occurs in the DM client 110 of the corresponding end device without an additional message by using the inward trap. In the embodiment, when the DM server 120 commands downloading the software packet PKG1 to the DM client 110 and the end device enters a low power (Low_Powered) state, a command to cancel the downloading of the packet PKG1 may be easily processed by using the TrapMO in order to reduce battery consumption.

As described above, both the inward trap and the outward trap which are two types of the trap may be divided into two processes of registration and notification. Both the registration and the notification are processed through a trap management object tree and how the inward trap event and the outward trap event are processed through the TrapMO tree will be described in detail.

Figure 3:
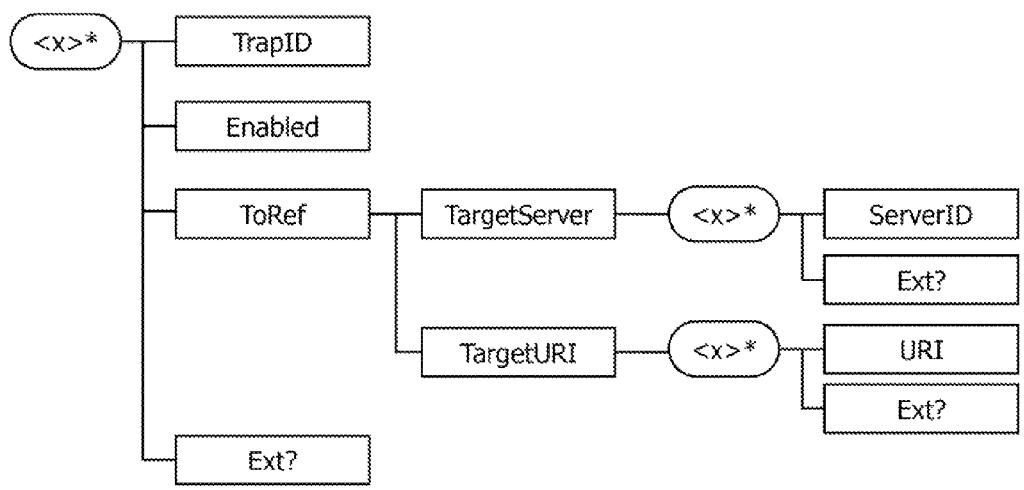
FIG. 3 is a diagram illustrating a structure of a trap management object tree in the related art.

FIG. 3 is a diagram illustrating a structure of a trap management object tree in the related art.

For example, a situation in which the DM server 120 registers the trap event trap_event1 in the DM client 110 as the inward type is assumed. When the trap event trap_event1 occurs, the TrapMO transfers the information regarding the occurred event to a specific URI URI1. In order to register the inward trap event, the DM server 120 retrieves an instance of the TrapMO in which a TrapID is the trap_event1 in the TrapMO instance of the DM client 110. The DM server 120 may traverse a TrapMO sub-tree of the DM client 110, retrieve the corresponding instance, or indicate the corresponding trap instance through a relative address as illustrated in Table 1 below.

TABLE 1

```
<Item>
    <TargetParent>
<LocURI>.?MOID=urn:oma:mo:oma-diagmontrap:1.0&TrapID=trap_event1</LocURI>
    </TargetParent>
    <Target>
        <LocURI>designate more detailed route below found TrapMO instance route</LocURI>
    </Target>
</Item>
```

When the DM server 120 finds the instance of the TrapMO by the aforementioned scheme, TargetURI is found among child nodes of the instance to add the URI URI1 which is a new inward trap therebelow.

When registration of the inward trap is completed by such a scheme, the TrapMO performs the notification to the corresponding component when the corresponding trap event trap_event1 occurs. After the DM client 110 monitors the occurrence of the trap event trap_event1, when the DM client 110 senses the occurrence of the trap event trap_event1, the DM client 110 retrieves the TrapMO instance in which the TrapID is the trap_event1. Alternatively, the DM client 110 may reuse the aforementioned relative address. The DM client 110 sends the execution command to a node indicated by a value of a URI node with all URIs registered below the TargetURI when the TrapMO instance is found. As a result, an inward notification process is completed.

On the contrary, a process in which the DM server 120 registers the trap event trap_event1 in the DM client 110 as the outward type will be now described. Hereinafter, a situation in which the DM server 120 transfers the occurred event to another DM server DMS1 in order to monitor the trap event trap_event1 of the DM client 110 is assumed. First, in order to register the outward trap event, the DM server 120 retrieves an instance in which in which the TrapID is the trap_event1 in the TrapMO instance of the DM client 110. During this process, the aforementioned relative address may be used. The DM server 120 adds identification information DMS1 of another DM server to a child node below a node 'ToRef/TargetServer' when the TrapMO instance is found, and as a result, a registration process is completed.

The registration of the outward trap is completed, and the DM client 110 just performs a notification of notifying the occurrence of the corresponding trap event trap_event1 to another DM server DMS1 when the corresponding trap event trap_event1. For this process, after the DM client 110 monitors the trap event, the DM client 110 senses the occurrence of the trap event trap_event1 and thereafter, retrieves the TrapMO instance in which the TrapID is the trap_event1 in the TrapMO. The DM client 110 transfers information on the trap event trap_event1 to all 'Served Ds' registered below the 'ToRef/TargetServer' in a TrapMO instance sub-tree. The transferring is achieved by using the generic alert (Generic Alert). During this process, since another DM server DMS1 is added while being registered as the 'ServerID' below the 'ToRef/TargetServer', another DM server DMS1 receives the information on the trap event trap_event1 from the DM client 110.

Since the inward trap of the TrapMO may execute an unspecific DM command to the end device, the inward trap of the TrapMO has a potential security risk. In order to prevent a risk caused due to the security problem, only the DM server 120 having the appropriate authority during the registration and the notification of the inward trap needs to perform the corresponding processes. That is, only the DM server 120 having a registration authority may have the registration of the inward trap, and when the inward trap performs a specific operation through a further notification process, the DM server 120 that registers the inward trap needs to have an execution authority.

However, the security problem of the inward trap is not handled in the trap framework in the related art. The reason is that the trap framework in the related art performs only checkation of the authority of the DM server 120 for the registration process during the registration and the notification of the inward trap. The reason is that the security faults of the trap framework has a DM security model problem on which the TrapMO depends rather than being caused by a problem of the TrapMO itself.

Figure 4A:
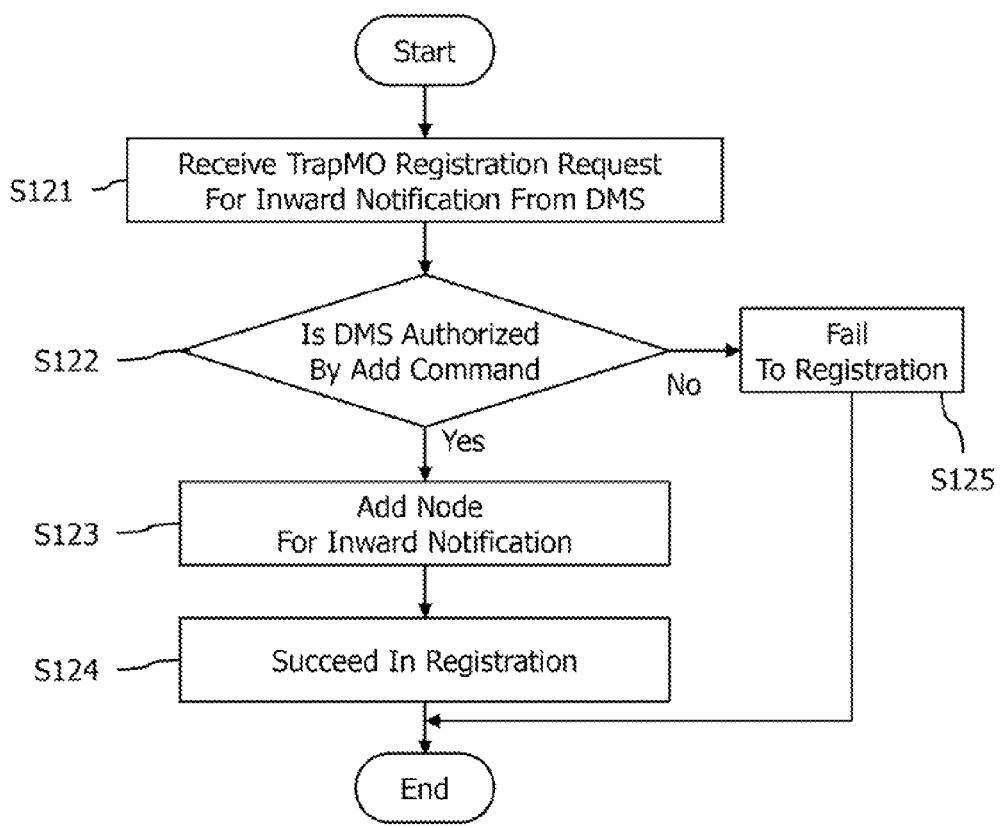
FIG. 4a is a flowchart illustrating a registration procedure for inward notification in the related art.

FIG. 4*a* is a flowchart illustrating a registration procedure for inward notification in the related art.

For successful registration, when the DM client 110 receives a registration request for the inward trap from the DM server 120 (S121), the DM server 120 that performs the registration checks whether the DM server 120 has an authority to execute a command Add to the 'ToRef/TargetURI' of the corresponding TrapMO instance (S122). That is, the DM client performs a process of checking whether the DM client 110 has an appropriate authority to perform the registration for the inward notification.

In step S122, when the DM server 120 has an addition authority to the corresponding node, a node for the inward notification is added (S123) to successfully complete the registration (S124). However, in step S122, when the DM server 120 has no addition authority to the corresponding node, the registration is failed (S125).

Figure 4B:
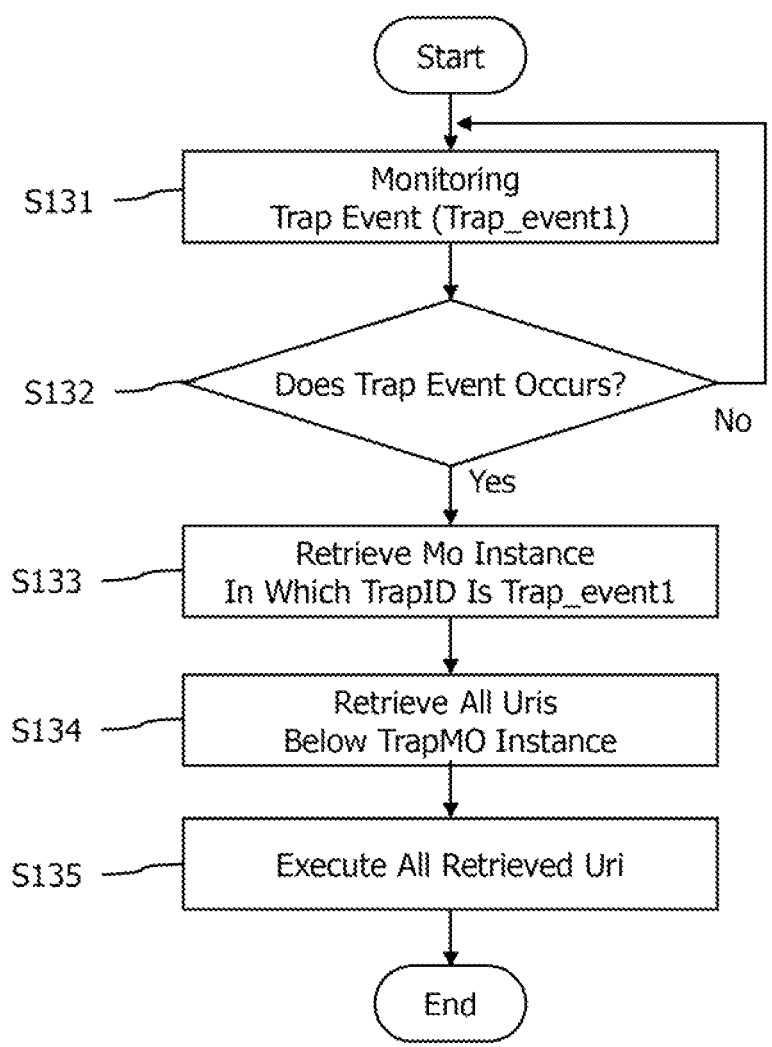
FIG. 4b is a flowchart illustrating a notification procedure after registration for inward notification in the related art.

FIG. 4*b* is a flowchart illustrating a notification procedure after registration for inward notification in the related art.

As known by referring to steps S131 to S135, the DM client 110 does not perform additional authority checking of the occurred inward trap while transferring the corresponding trap event to a designated node and executing the corresponding trap event. As described above, the problem is caused by the problem of the DM security model on which the TrapMO depends rather than the problem of the TrapMO itself.

That is, according to the DM security model, the DM client 110 determines a subject that executes the DM command before executing the DM command and checks whether the corresponding subject has an authority required to execute the DM command. The security checking is applied to the registration process of the inward trap to check whether the DM server 120 that performs the registration has the addition authority to the TrapMO instance associated with the trap event to be monitored. Therefore, it is assured that the DM server 120 has an authority required for the registration. However, during the notification process, a subject that transfers the information on the occurred event to the designated node is the TrapMO enabler and a subject that actually executes the command is a functional component that receives the event information. Therefore, the subject that executes the command registered in the inward trap is not the DM server 120. A characteristic of the notification process of the inward trap is that the security problem of the inward trap is not solved by the DM security model in the related art.

Figure 5A:
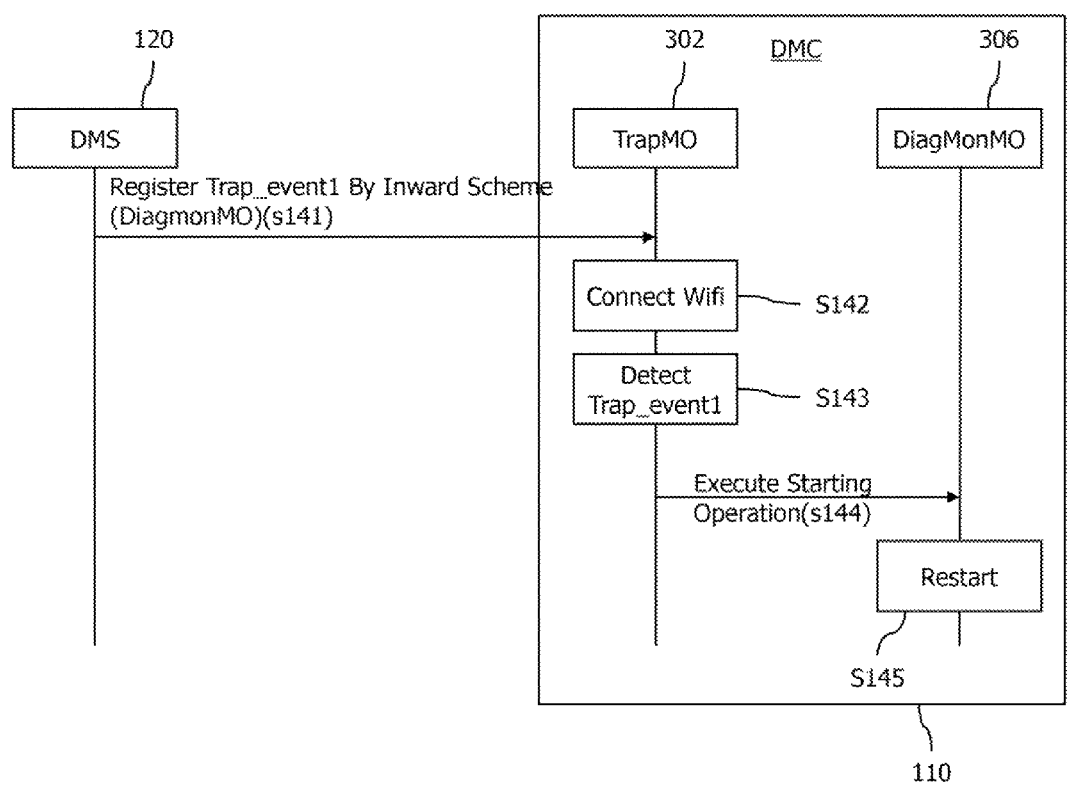
FIG. 5a is a flowchart illustrating a problem of a method of processing an inward trap in the related art.

FIG. 5*a* is a flowchart illustrating a problem of a method of processing an inward trap in the related art.

In the exemplary embodiment, it is assumed that the DM server 120 has no authority to restart the device (in this example, has no execution authority for 'DiagMonMO/Restart/Operations/Start') and has the addition authority to the corresponding TrapMO instance to be monitored.

The DM server 120 sends the DM command to request the registration in order to monitor the trap event trap_event1 (WiFi_Connected) of the DM client 110 (S141). In this case, the DM server 120 registers the inward trap so that the trap event is notified to 'DiagMonMO/Restart/Operations/Start'.

The DM client 120 monitors the trap event trap_event1 (WiFi_Connected). When WiFi is connected (WiFi_connected) (S142), the DM client 120 senses that the trap event (trap_event1 (WiFi_Connected) occurs (S143).

The TrapMO 302 transfers the information on the occurred trap event to 'DiagMonMO/Restart/Operations/Start' as the inward trap occurs (S144).

A diagnostic and monitoring management object (DiagMonMO) 306 restarts the end device according to a received command (S145).

As known in the embodiment, although the DM server 120 that does not have an authority to restart the DM client 110 just has an only authority to add a node to a sub-tree of the TrapMO, the DM server 120 may restart the end device. In addition, this may be a serious security risk.

On the contrary, the outward trap may designate even any server as the server that notifies the occurrence of the event when the DM server 120 registers monitoring the trap event in the DM client 110. Such a characteristic has an advantage of increasing extensibility and flexibility while configuring the DM server 120 in order to provide an OMA DM service. That is, the DM server 120 that performs the registration in the trap event and the DM server 120 that monitors the trap event are separated from each other to increase the extensibility and the flexibility. However, such a function of the outward trap has one disadvantage and the disadvantage is that another DM server which does not intend to monitor the trap event may be set to receive the trap event.

The disadvantage of the outward trap causes a security weakness and a simple weakness is that the trap event may be sent to the DM server 120 that does not desire receiving the trap event and a general weakness is that when the outward trap is registered in a plurality of end devices to be received by a specific DM serer 120, the corresponding DM server 120 receives so many trap events to be abused for a denial of service (DoS) attack.

Figure 5B:
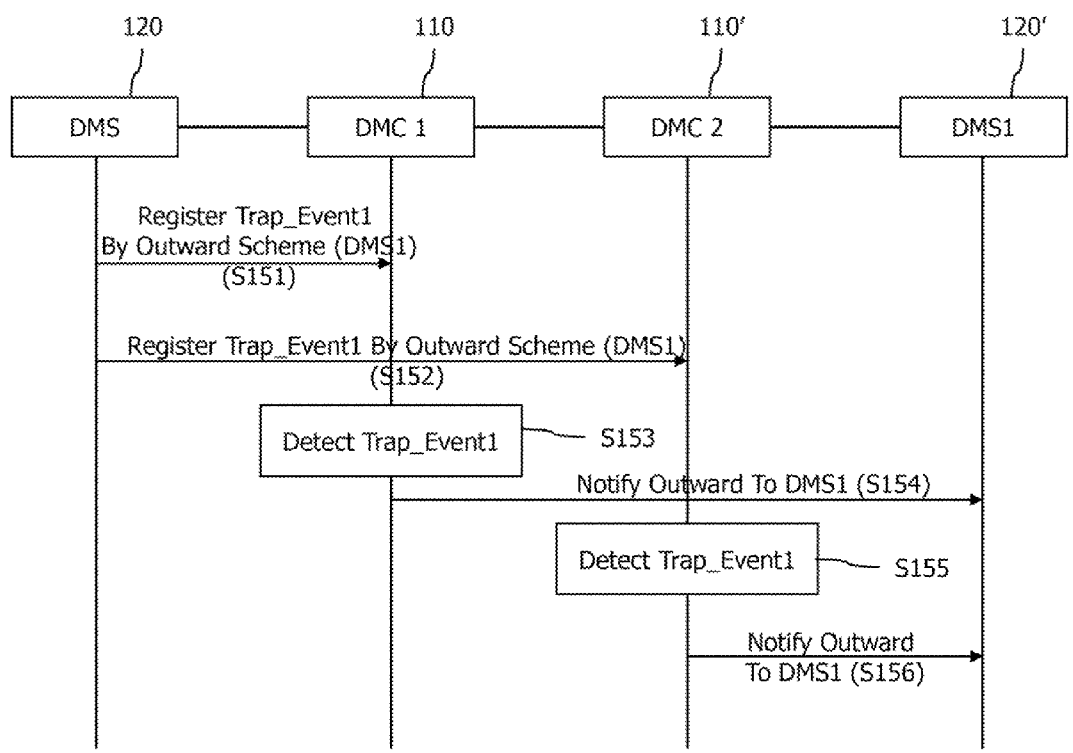
FIG. 5b is a flowchart illustrating a problem of a method of processing an outward trap in the related art.

FIG. 5*b* is a flowchart illustrating a problem of a method of processing an outward trap in the related art.

A first DM server 120 is set to register the outward trap in the 'trap_event1' of a first DM client 110 and transfer the information on the occurred event to a second DM server 120' (S151). Similarly, the first DM server 120 is set to register the outward trap even in the 'trap_event1' of the second DM client 110' and transfer the information on the occurred event to the second DM server 120' (S152).

Each of the first DM client 110 and the second DM client 110' senses the trap event trap_event1 (S153 and S155).

Each of the first DM client 110 and the second DM client 110' that senses the trap event trap_event1 transfers the information on the occurred trap event to the second DM server 120'.

As known in the exemplary embodiment, the DM server 120 may transfer the event to the DM server 120 that does not desire the trap event by using the outward trap and further, may use the trap event for the DoS attack.

Figure 6:
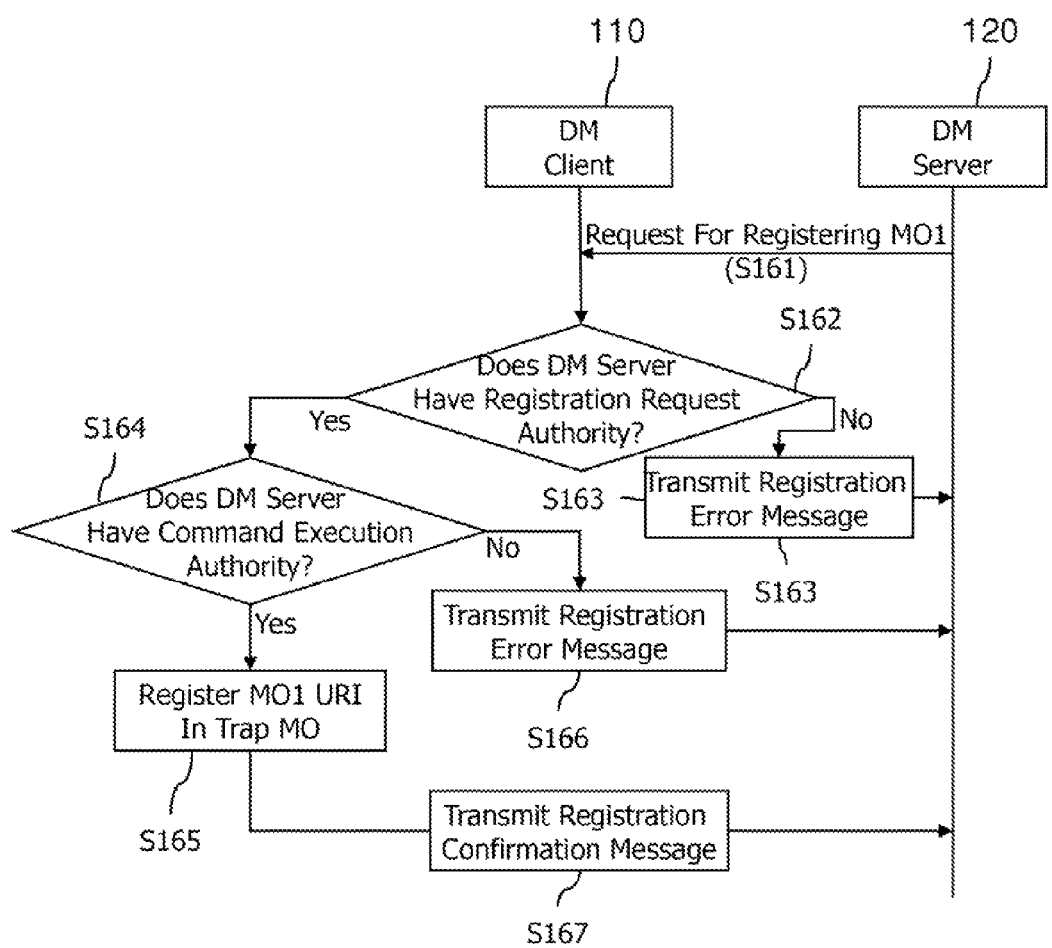
FIG. 6 is a flowchart illustrating a method for reinforcing a security of a TrapMO in the related art.

FIG. 6 is a flowchart illustrating a method for reinforcing a security of a TrapMO in the related art.

As one attempt for solving the problem, US Patent Publication No. US2010/0121967 of which the title of the invention is "System and method for device management security of trap management object" proposes a new method for reinforcing the security of the TrapMO. The proposed method includes checking whether the existing DM server 120 has an authority to register the corresponding inward trap (S162), additionally checking whether the DM server 120 has an authority to execute the command to be executed due to the inward trap (S164), and allowing only a DMS having registration and execution authorities to register the inward trap (S165 and S167).

However, the proposed method has a problem due to a runtime characteristic of an OMA DM access control list (ACL) on which the TrapMO depends. In the DM, each node is regulated to have an ACL property and the ACL property indicates that which command authority the DM server 120 has to the corresponding node. A problem is that the ACL of the node has the runtime characteristic, the ACL is changed. Therefore, although the DM server 120 permits the registration because the DM server 120 has the execution authority simultaneously during the registration, the DM server 120 loses the execution authority due to the ACL which is changed afterwards. Further, when the weakness is used, when the command having the execution authority is first registered in the inward trap, and the corresponding command is changed to another command having no authority afterwards, the DM server 120 may execute the command having no execution authority.

Since another problem of the proposed method does not include a method for enhancing the security weakness of the outward trap, sensitive end device information is exposed to the outside by transferring the trap event which is not permitted by using the outward trap, the event is transferred to the DM server 120 that does not desire the trap event, or the proposed may be abused for the DoS attack.

Therefore, the embodiments provide a method that can compensate for the security weaknesses associated with the inward trap and the outward trap of the TrapMO. To this end, the embodiments of the present invention provide respective security reinforcing methods for the inward trap and the outward trap.

A method is presented, in which the DM server 120 performs the inward trap registration in the DM client with respect to the inward trap and when the event actually occurs and the registered command is execute, only the DM server 120 having the authority may execute the command. In this case, a method is presented, which may decide whether the command is executed by reflecting the ACL even though the ACL which is the runtime property of the DM tree is changed.

Two methods are presented, which reinforce the security of the outward trap in association with the outward trap. A first method is a method that permits only reliable DM servers 120 to receive the event because the DM client 110 is bootstrapped by using DM account information of the DM client 110 at the time of the registering the outward trap. A second method is a method which may be efficiently used when an attempt for the outward trap which violates the security is low as an optimistic notification control.

Hereinafter, a method for reinforcing the TrapMO security according to the embodiments disclosed in the specification will be described in terms of the inward trap and the outward trap.

Figure 7:
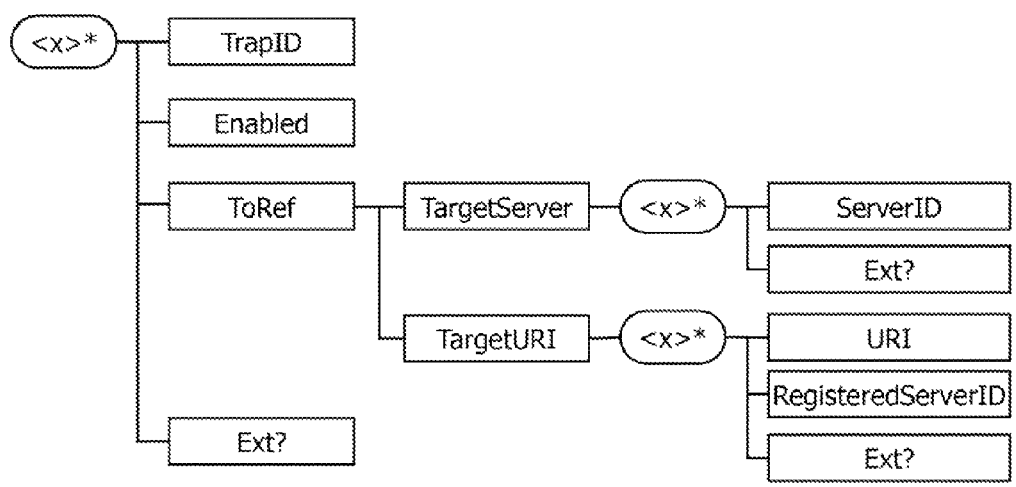
FIG. 7 is a diagram a trap management object tree according to embodiments disclosed in the specification.

FIG. 7 is a diagram a trap management object tree according to embodiments disclosed in the specification.

As compared with the trap management object tree in the related art, the trap management object tree according to the embodiments disclosed in the specification further includes a node 'ToRef/TargetURI/<x>/RegisteredServerID'. Server identification information of the DM server 120 that registers the corresponding trap event is stored in the node. When the trap event occurs after the registration, the DM client 110 determines whether the DM server 120 registering the trap event has the execution authority in the ACL by referring to the server identification information stored in the trap event to solve the security problem reflected with the runtime.

First, a method for reinforcing the security of the inward trap will be described. In this method, the DM client 110 transfers the inward notification to the command registered in the corresponding trap event when the trap event occurs and determines whether the DM server 120 has the authority required to execute the command by referring to ACL information which is dynamically changed before executing the command.

As used herein, transaction from one state to another state means execution from one state to another state. As recognized by a user, a process may be performed immediately, substantially immediately, gradually, or at other appropriate speeds. A progress of the process may be automatically controlled by the device such as the end device regardless of the user once the process is activated or controlled by the user. It may be recognized that a process flow described below includes numerous operations which seems to occur in a specific order, but the process may include more or less operations which are executable in series or in parallel (for example, using a parallel processor or a multi-threading environment).

Figure 8A:
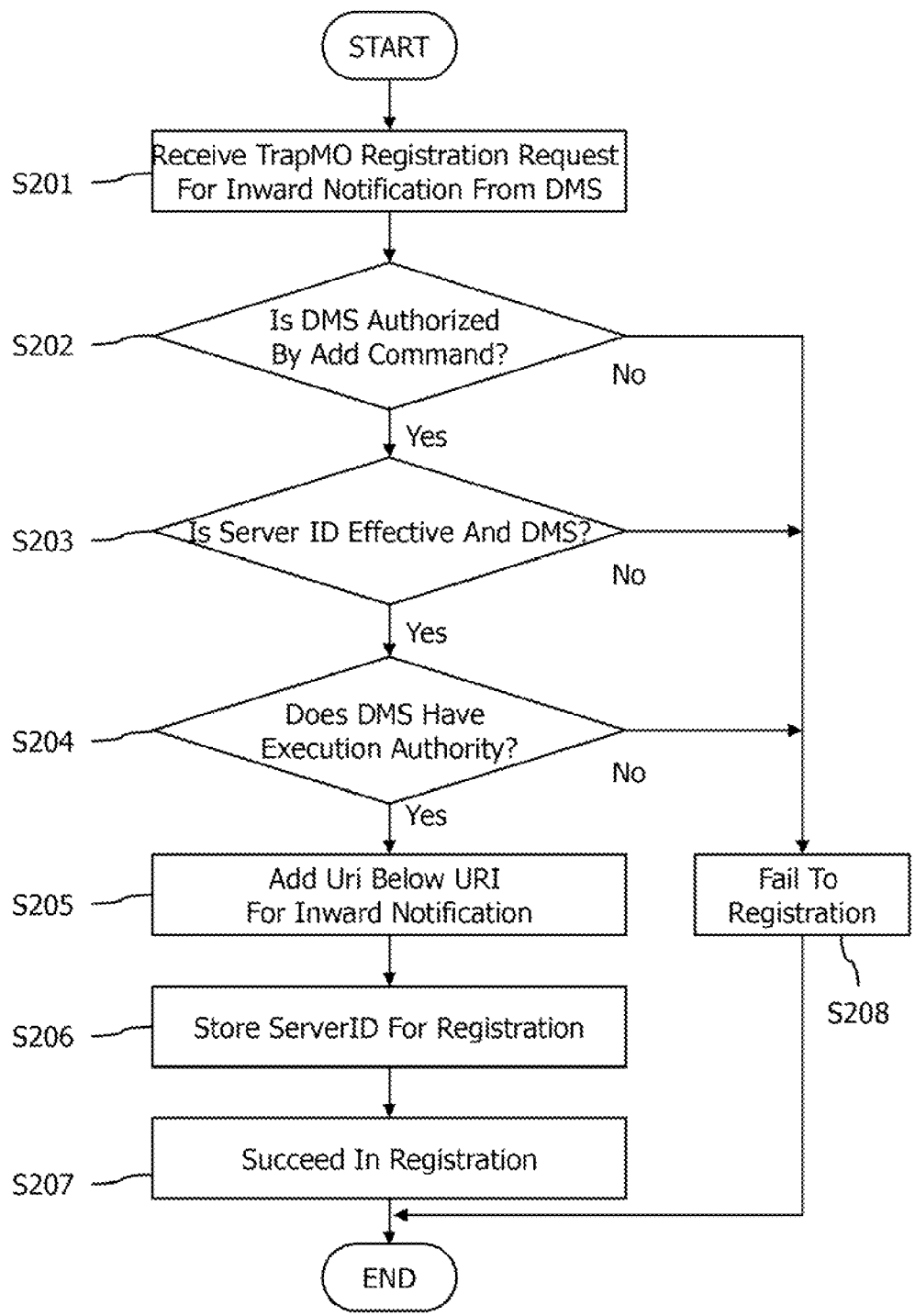
FIG. 8a is a flowchart illustrating a process of reinforcing a security in registering an inward trap according to a first embodiment of the present invention.

FIG. 8a is a flowchart illustrating a process of reinforcing a security in registering an inward trap according to a first embodiment of the present invention.

This method includes a process of storing an identifier ('ServerID') of the DM server 120 that performs the registration while the DM server 120 performs the registration in order to monitor a specific trap event trap_event1 to the DM client 110. The identifier of the DM server 120 uniquely indicates the DM server 120 and may include a domain name of the DM server 120. The DM client 110 needs to check whether the 'ServerID' to be stored is correct before storing the 'ServerID' (identifier) of the DM server 120 and to this end, the DM account information of the DM client 110 may be used. Since the DM account stores information of the DM server 120 bootstrapped by the DM client 110 and the stored information also includes authorization information, the DM client 110 checks whether the 'ServerID' of the DM server 120 is correct (valid), and stores only the 'ServerID' which is conformed to be correct (valid) and successfully completes the registration. If the 'ServerID' is not correct (valid), the registration is failed.

The DM client 110 receives an inward trap registration request for monitoring the trap event trap_event1 (ID of the trap event to be monitored) from the DM server 120. The inward trap registration request represents that the DM server 120 sends a command Add to the DM client 110 and the command Add below 'ToRef/TargetURI' is requested by retrieving an instance in which the TrapID is 'trap_event1' in the instances of the TrapMO. When the added node needs to include an address ('URI1') of a node to be executed when the trap event occurs.

The DM client 110 checks whether the DM server 120 has an authority to execute the corresponding command when receiving the command Add from the DM server 120 (S202). This is a process of checking the registration authority of the DM server 120 and in step S201, it is checked whether the DM server 120 has an Add authority with respect to a target node of the command Add sent by the DM server 120. The Add authority may be checked by checking whether the DM server 120 is included in the Add authority of an ACL (for example, Add=DMS) by acquiring the ACL of the target node.

The DM client 110 acquires the ServerID (server identifier) of the DM server 120 that performs the inward trap registration to determine appropriateness of the ServerID (S203). The appropriate ServerID needs to include information of the DM server 120 including the 'ServerID' in the DM account of the DM client 110 by the DM client 110's completing bootstrapping, and further, the appropriate ServerID needs to be the ServerID of the DM server which may be authorized by using the authorization information included in the DM account. IN addition, the appropriate ServerID needs to be the ServerID of the DM server that registers the inward trap at present, that is, 'DMS'.

It is checked whether the DM server 120 has an authority to execute a node indicated by a value of 'ToRef/TargetURI/<x>/URI', that is, the DM server 120 has an execution ACL in the corresponding node (S204). In this process, a notification authority of the inward trap is checked and the authority may be checked by checking whether for example, 'Exec=ServerID' is included in an ACL value of the node. A method of forming an ACL authority is described in detail in, for example, [OMA-DM-TND] and a detailed description thereof will be omitted.

The DM client 110 performs the inward trap registration when the DM server 120 has an appropriate registration authority through steps S202 to S204 (S205). In this process, the Add DM command sent by the DM server 120 in step S202 is executed.

The DM client 110 stores the appropriate 'ServerID' of the DM server 120 and maps with the inward trap registration (S206). Therefore, the DM client 110 may bring the 'ServerID' that performs the registration afterwards.

When up to step S206 is successfully completed, the inward trap registration is completed and the registration is succeeded (S207).

However, when any one step of steps S202 to S204 is failed, the registration is failed (S208). When the registration is failed, the DM client 110 additionally a result code (for example, "not authorized") to notify a registration failure to the DM server 120.

Figure 8B:
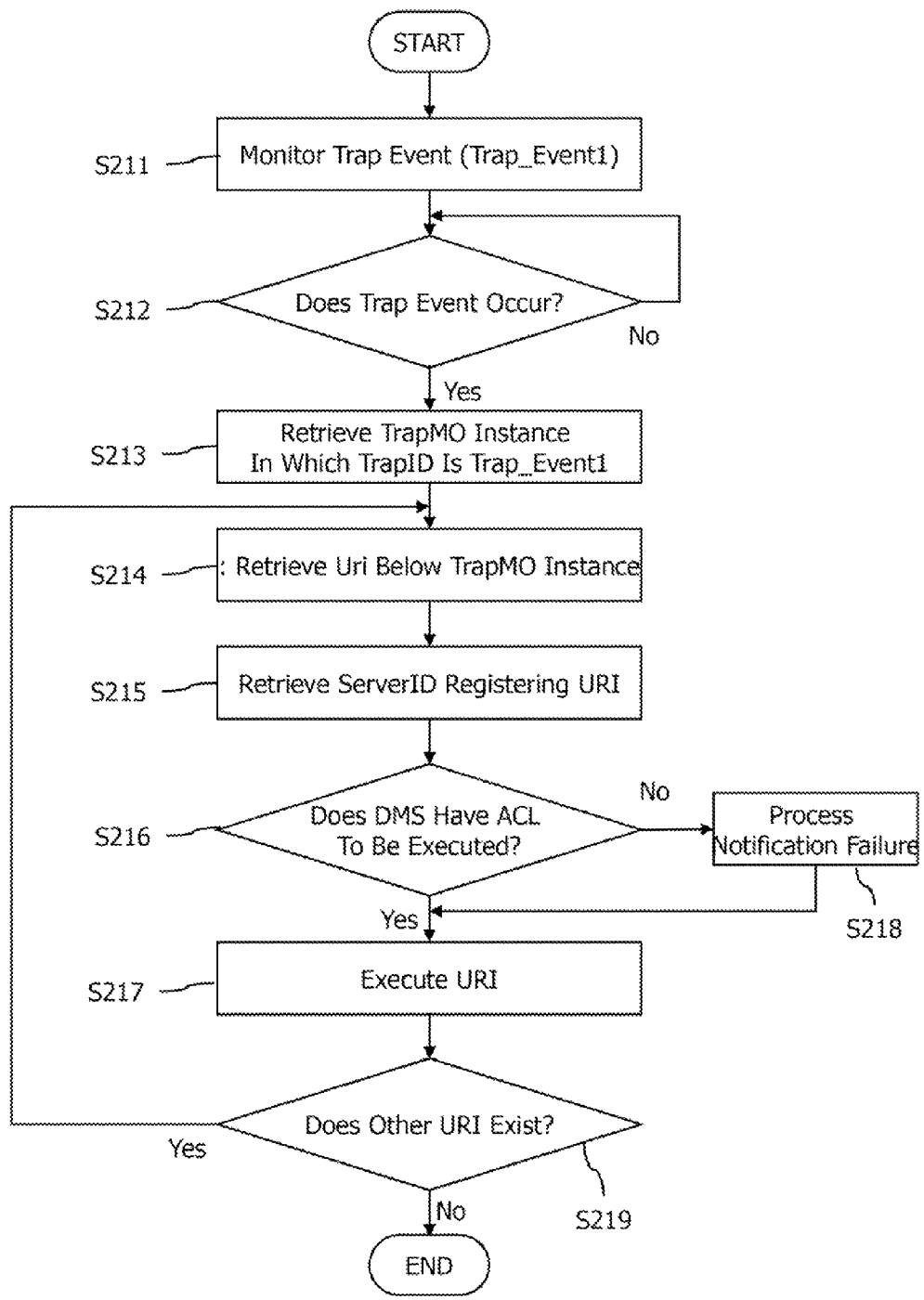
FIG. 8b is a flowchart illustrating a process of reinforcing a security in notifying an inward trap according to the first embodiment of the present invention.

FIG. 8b is a flowchart illustrating a process of reinforcing a security in notifying an inward trap according to the first embodiment of the present invention.

The embodiment presents a method of safely executing only a command which the DM client 110 is determined to have an authority by reflecting an ACL of a DM tree which is dynamically changed in association with notification of the inward trap. The DM client 110 requires information regarding which DM server 120 performs the inward trap registration to cause the corresponding notification in order to determine whether the command executed through the notification of the inward trap may be authorized. Since the DM client 110 stores only the 'ServerID' of the appropriate DM server 120 during the inward trap registration by using the inward trap registration process illustrated in FIG. 8a, the information may be usable during the notification. The DM client 110 determines whether the 'ServerID' performing the registration has a performing authority before performing the command as a result of the inward trap notification to perform only a safe command.

If such a process is not performed, since the DM client 110 determines that a subject executing the performing command as the result of the notification of the inward trap is the TrapMO enabler or a functional component receiving the inward trap notification, the DM client 110 may not know whether the corresponding command is permitted. However, according to the embodiment, the subject of the command execution may be accurately known and it is clearly known whether there is a security problem in the command execution therethrough. Further, the DM client 110 determines whether the command execution is permitted by reflecting the ACL which is dynamically changed by checking ACL information just before the command execution.

The DM client 110 monitors the identification information ('trap_event1') of the trap event (S211) and senses the occurrence of the trap event (S212).

The DM client 110 retrieves the TrapMO instance in which the TrapID is the 'trap_event1' in the TrapMO when sensing the occurrence of the trap event (S213).

The DM client 110 brings a corresponding URI ('ToRef/TargetURI/<x>/URI') in a sub-tree of the TrapMO instance discovered in step S213 (S214).

The DM client 110 brings the 'ServerID' of the DM server 120 that registers the corresponding URI ('ToRef/TargetURI/<x>/URI') (S215).

The DM client 110 checks whether the brought 'ServerID' has an authority to execute a node indicated by a value of the corresponding URI ('ToRef/TargetURI/<x>/URI'), that is, whether the brought 'ServerID' has an execution ACL in the corresponding node (S216). In this process, a notification authority of the inward trap is checked and the authority may be checked by checking whether 'Exec=ServerID' is included in an ACL value of the node.

When it is determined that there is the notification authority in step S216, the DM client 110 executes the node indicated by the value of the corresponding URI ('ToRef/TargetURI/<x>/URI') (S217).

It is checked whether a URI ('ToRef/TargetURI/<x>/URI') in which the inward trap notification is not yet performed (S218) and if so, the process returns to step S214. If not, the inward trap notification process is terminated.

When it is determined that there is no notification authority in step S216, a notification failure is processed. In the case of the notification failure, the DM client 110 may process the notification failure by methods described below.

In a first method, when the notification is failed, the DM client 110 does not perform an additional work (silent discard).

In a second method, when the notification is failed, the DM client 110 sends a generic alert to the DM server 120 (Generic Alert to DMS). The generic alert needs to include a type of notifying the notification failure (for example, 'urn:oma:attrapmo:1.0:InwardNotificationFailed') and detailed information on the notification failure may be included in '<Data>' of the generic alert (for example, a reason for the notification failure: Not authorized).

In a third method, when the notification is failed, the DM client 110 cancels the corresponding inward trap registration.

This cancels the inward trap in which the notification is failed to prevent the notification failure from continuously occurring. The DM client 110 notifies the notification failure to the DM server 120 before canceling the inward trap and if necessary, the DM client 110 allows the DM server 120 to process the notification failure. That is, the DM client 110 may perform a necessary action in order to the execution authority.

Figure 9:
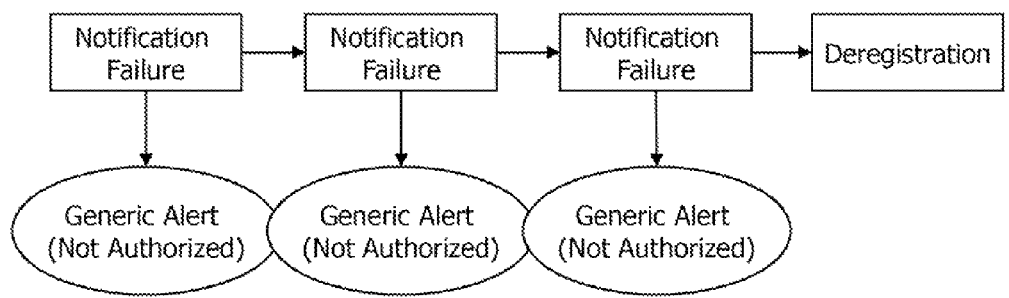
FIG. 9 is a diagram illustrating a notification failure processing process according to the first embodiment of the present invention.

FIG. 9 is a diagram illustrating a notification failure processing process according to the first embodiment of the present invention.

Referring to FIG. 9, the DM client 110 notifies two notification failures to the DM server 120 through the generic alert before cancelling the trap event. Until the notification failure occurs twice at first, the notification failure is notified to the DM server 120 through the generic alert. The generic alert at that time is the same as the generic alert of the second method. In addition, when a third notification failure occurs, the DM client 110 sends the generic alert having a content indicating the cancellation of the corresponding inward trap to the DM server 120. The generic alert includes a type (for example, 'urn:oma:at:trapmo:1.0:InwardTrapUnregistered') that notify the cancellation of the inward trap and the generic alert may include detailed information (for example, the number of times of notification failures which occurs previously and a reason therefor) on the cancellation of the event trap). The DM client 110 may send the generic alert to notify the cancellation of the event trap to the DM server 120 before the cancellation or after the completion of the cancellation. The embodiment illustrated in FIG. 9 represents a case in which the DM client 110 sends the generic alert to notify the cancellation of the event trap is sent before cancelling the event trap. The DM server to which the cancellation is notified is the DM server 120 that registers the cancelled inward trap, and a 'ServerID' of the DM server 120 is stored in, for example, 'ToRef/TargetURI/<x>/RegisteredServerID'.

The DM client 110 may not send the generic alert when the notification is failed and the DM client 110 and the DM server 120 may decide the number of times of notification failures until the trap event is cancelled through a negotiation.

The mechanism of the security inward trap described above will be divided into the registration and the notification and arranged below again.

For security trap operations, the end device needs to authorize that the DM server 120 has appropriate authorities for the inward registration and notification described below.

During the registration, the DM server 120 adds a sub-tree below the node 'ToRef/TargetURI' to register the inward trap. If the DM server 120 does not have an execution authority of an executable node indicated by the 'ToRef/TargetURI', the registration is not permitted. The end device needs to verify the execution authority together with basic ACL rules (for example, an Add authority for adding the sub-tree). If the DM server 120 does not have the execution authority, the registration needs to be rejected together with the TrapMO result code '1400 (the registration is failed due to an insufficient authority)'. After the registration is succeeded, the node 'ToRef/TargetURI/<x>/RegisteredServerID' needs to be set together with the server identifier that registers the inward trap by the end device.

During the notification, if the DM server 120 which is identified by the node 'RegisteredServerID' which is a brother node of the 'ToRef/TargetURI/<x>/URI' just has the execution authority of the executable node indicated by the node 'ToRef/TargetURI/<x>/URI', the trap may be notified to the executable node indicated by the node 'ToRef/TargetURI/<x>/URI'. A method of verifying the execution authority is an implementation issue, but it need to be considered that the ACL may be dynamically changed. For example, the end device needs to check an execution permission authority before notifying the trap event or the end device needs to start a checking process with the change of the ACL.

If the DM server 120 does not have the execution authority of the executable node, the related inward trap registration needs to be cancelled as soon as practical. After the inward trap is cancelled, the end device needs to remove a corresponding sub-tree below the node 'ToRef/TargetURI'. The generic alert may be transmitted to the DM server 120 identified by the node 'RegisteredServerID' in order to notify the cancellation.

Figure 10:
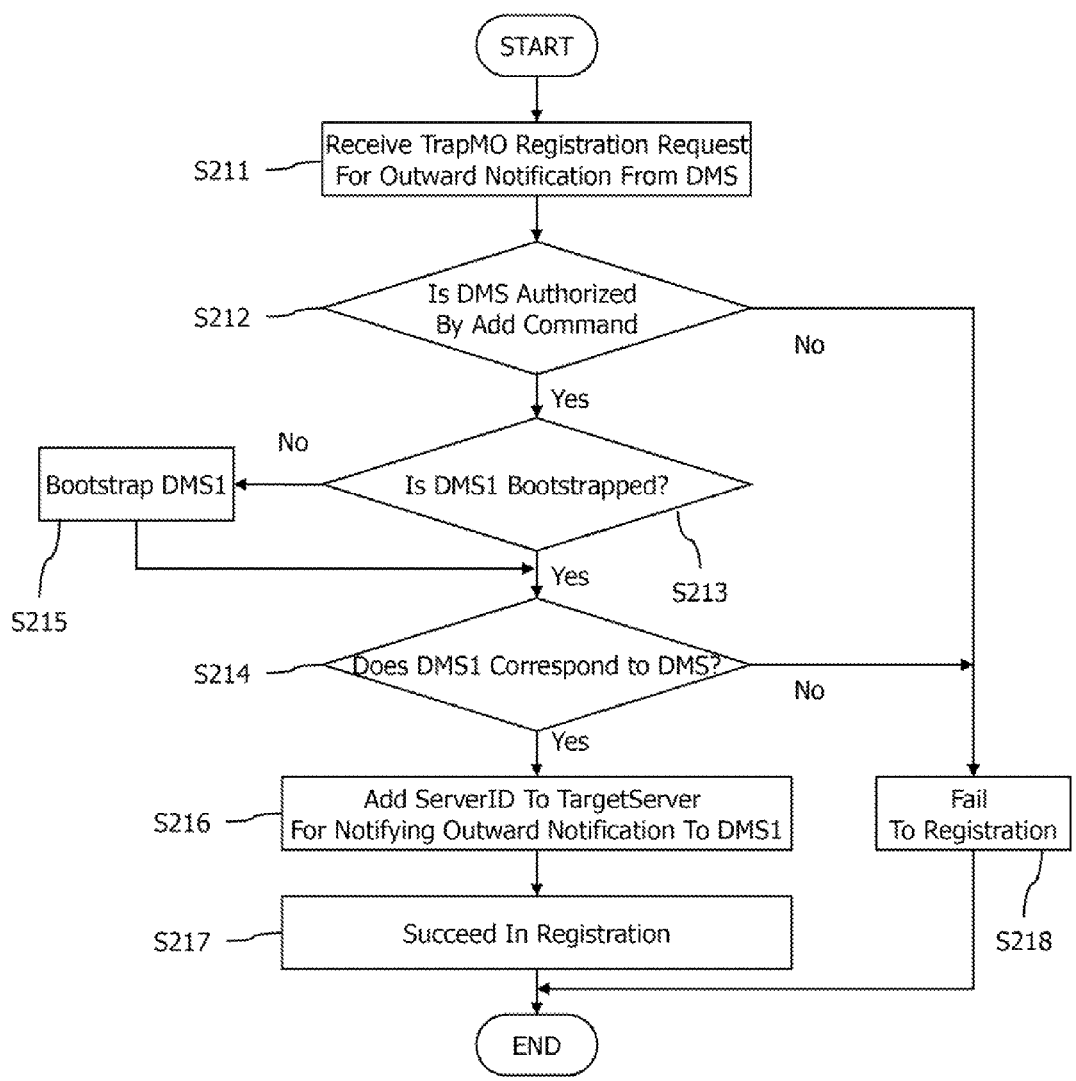
FIG. 10 is a flowchart illustrating a process of reinforcing a security in registering an outward trap according to a second embodiment of the present invention.

FIG. 10 is a flowchart illustrating a process of reinforcing a security in registering an outward trap according to a second embodiment of the present invention.

The second embodiment of the present invention is a method using the DM account information in the DM client 110 when the DM server 120 to which the occurred trap event is transferred is registered in the outward trap. The information of the DM server 120 which the DM client 110 registers through bootstrapping needs to be stored in the DM account of the DM client 110. The information of the DM server 120 stores an address, authorization means, an authorization value, and the like of the DM server 120 in addition to the 'ServerID'. That is, it may be considered that DM servers 120 registered in the DM account have a trust relationship with the DM client 110.

Types of the trap events of the DM client 110 are very wide and may include even sensitive information in terms of privacy thereamong. For example, a trap event which occurs when the end device moves to a specific region is so. Therefore, the DM server 120 to which the trap event is transferred needs to be limited to a DM server 120 in which the DM client 110 may trust and whether to trust in a predetermined DM server 120 may be checked through the DM account information of the DM client 110. When it is determined that the DM server 120 to which the trap event is to be transferred is not registered in the DM account, and as a result, there is no trust relationship, the DM client 110 may generates the DM account by performing bootstrapping with the corresponding server and thereafter, perform the registration process. Alternatively, in order to further reinforcing the trap event information security of the DM client 110, the DM server 120 that receives the outward trap event may be limited to the DM server 120 itself that performs the registration.

The DM client 110 receives, from the DM server 120, the outward trap registration request for monitoring the 'trap_event1' (TrapID) which is the trap event (S211). The request may be a request to transmit a result of the occurred trap to the DM server identified as 'DMS1'.

The DM client 110 checks whether the DM server 120 has an authority to perform the outward trap registration (S212). This process may be achieved by retrieving the TrapMO instance in which the TrapID is the 'trap_event1' and checking the DM client 110 has an authority to add the retrieved TrapMO instance to the 'ToRef/TargetServer' which is a sub-node thereof.

The DM client 110 checks whether another DM server DMS1 which the DM server 120 intends to register as a trap event receiver is a DM server 120 which the present DM client 110 bootstraps (S213). This may be checked by discovering a DMAcc instance having the 'ServerID' of the DM server DMS1 in the DM account which the DM client 110 has. In addition, additionally, it may be verified whether the DMS server DMS1 is a correctly bootstrapped DM server by checking authorization information stored in the discovered DMAcc instance, and the like.

Since the DM server DMS1 is not bootstrapped, if there is no trust relationship, the DM client 110 attempts bootstrapping to the DM server DMS1 (S215). Although not illustrated, when the bootstrapping process is failed, the process proceeds to step S218 to fail to the registration.

The DM client may prevent the DM server 120 from registering a DM server 120 other than the DM server 120 as the trap event receiver, in order to reinforce a security associated with the trap event (S214). The DM client 110 may check whether the DM server 120 and the DM server DMS1 are correctly bootstrapped servers and compare the ServerID of the DM server 120 and the ServerID of the DM server DMS1.

In step S214, when the DM server 120 and the DM server DMS1 are the correctly bootstrapped servers, and the ServerID of the DM server 120 and the ServerID of the DM server DMS1 are the same as each other, the registration process is performed. That is, the DM server DMS1 is added as a child node below the node 'ToRef/TargetServer' (S216), and as a result, the registration process is successfully completed (S217).

When the registration is failed, a result code corresponding to the registration failure is returned (S218).

The security outward trap described above is arranged below again.

When the DM server 120 desires receiving traps from the end device, the sub-tree will be added below the node 'ToRef/TargetServer'. In order to succeed in the registration, the end device needs to verify whether the node 'ToRef/TargetServer/<x>/ServerID' is set as the server identifier (for example, the DM server is incapable of registering other DM servers) of the DM server itself. When the registration is failed, the end device needs to transmit concealment of a status code '403'. Once the registration is succeeded, the node 'ToRef/TargetServer/<x>/ServerI' need not be changed.

Figure 11A:
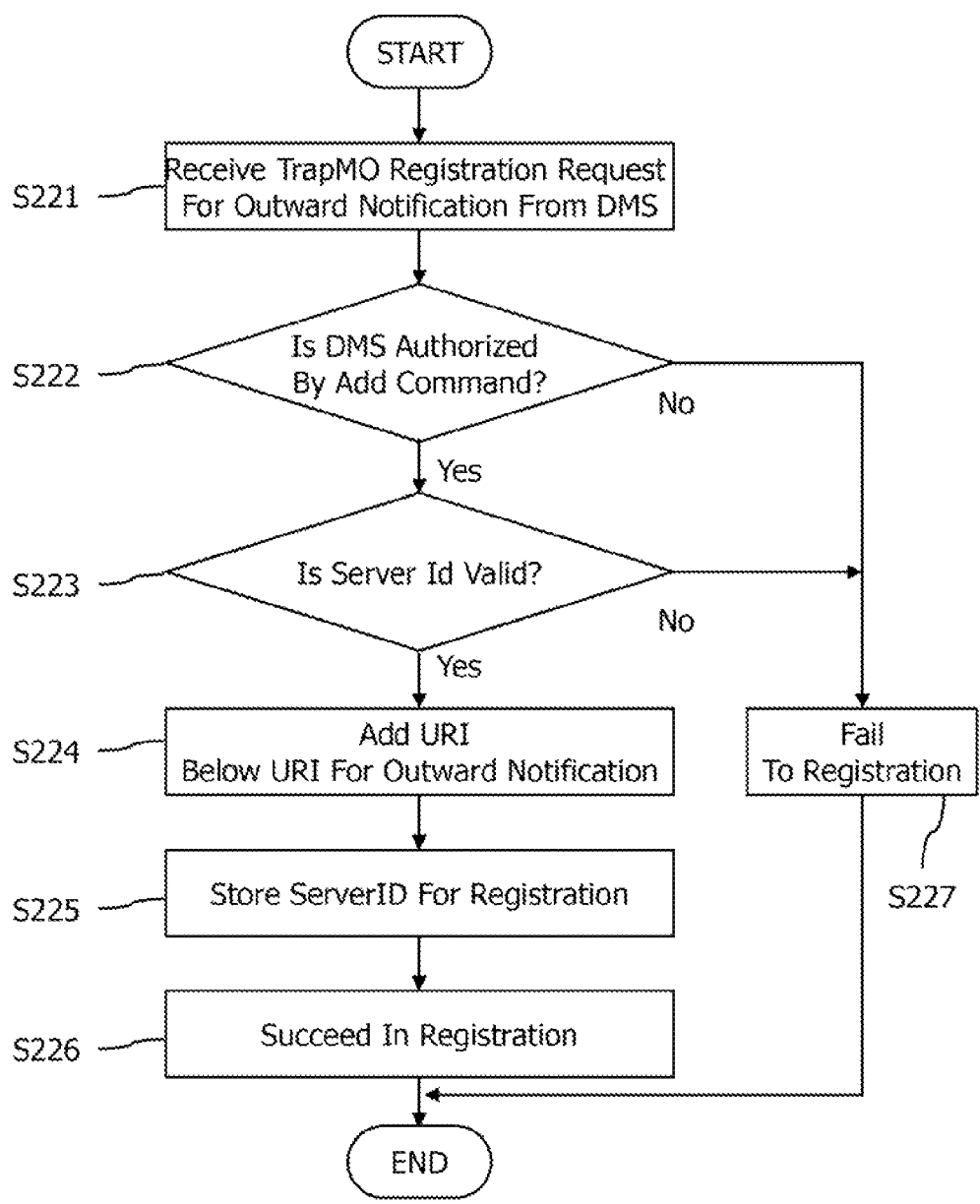
FIGS. 11a and 11b are flowcharts illustrating a process of reinforcing a security in registering an outward trap according to a third embodiment of the present invention.
Figure 11B:
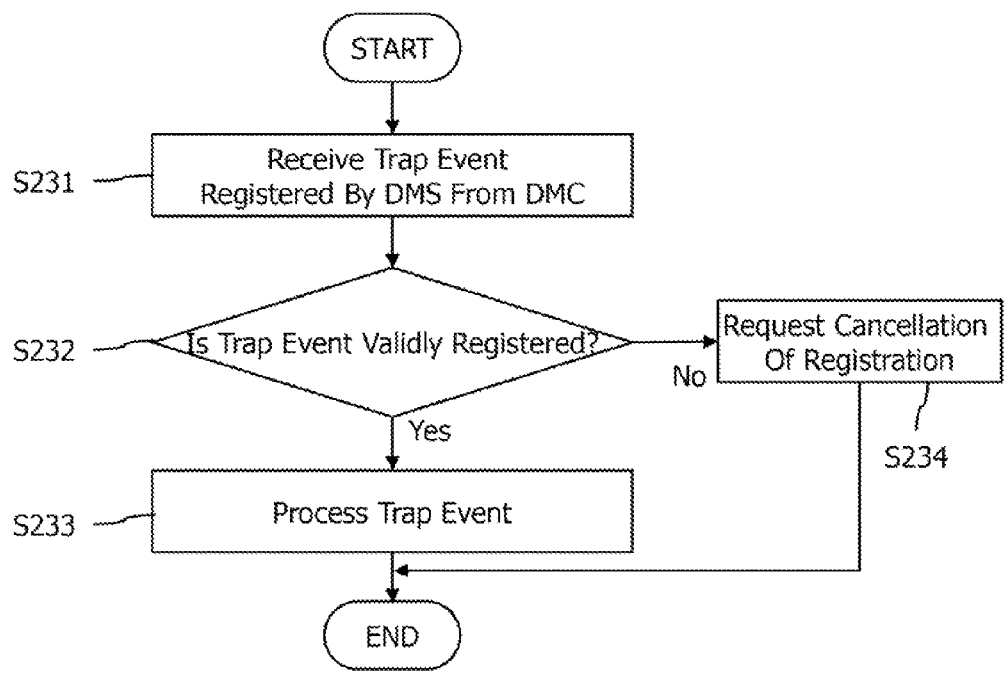

FIGS. 11a and 11b are flowcharts illustrating a process of reinforcing a security in registering an outward trap according to a third embodiment of the present invention.

A second method of reinforcing the outward trap security is an optimistic notification control. The first method is a method that sends the trap event which is sensitive information of the DM client 110 to only the trustable DM server 110, while the second method is a method that prevents the trap event of the DM client 110 from being transmitted to the DM server 120 that does not receiving the event. In the outward trap registration, an unspecific DM server 120 may be registered as the trap event receiver, and the trap event may be transferred to the DM server 120 that does not desire the trap event or furthermore, the trap event may be abused in the DoS attack. The second method solves the security weakness of the outward trap and simultaneously, is very effective under a situation in which malicious outward trap registrations are not a lot.

To this end, the DM client 110 performs the outward trap registration process similarly to the conventional process. That is, when a predetermined DM server is registered as the trap event receiver, the registration is performed without an additional checking process for finding whether the DM server 120 desires receiving the trap event. However, the DM client 110 stores the server identifier 'ServerID' of the DM server 110 that performs the corresponding outward trap registration. Of course, the stored 'ServerID' needs to be an appropriate 'ServerID' which is checked through the DM account. When the DM client 110 transmits event information to the DM server registered as the receiver as a trap event occurs afterwards, the DM client 110 sends even information on a 'ServerID' that performs registration of the trap event. The DM server that receives the trap event information determines whether receiving the trap event is safe through the 'ServerID' and a trap event content annexed together with the event information. If it is determined that receiving the trap event is not safe, the DM server may request cancellation of the trap event registration by sending a response to the DM client 120.

Referring to FIG. 11a, the DM client 110 receives, from the DM server 120, the outward trap registration request for monitoring the 'trap_event1' (TrapID) which is the trap event of the DM client (S221). In this case, the request may be a request that allows a result of the occurred trap to the DM server DMS1.

The DM client 110 checks whether the DM server 120 has an authority to perform the outward trap registration (S222). This process may be achieved by checking whether the DM client 110 has an authority to retrieve the TrapMO instance in which the TrapID is the 'trap_event1' and add the retrieved TrapMO instance to the 'ToRef/TargetServer' which is a sub-node thereof.

The DM client 110 acquires the ServerID (server identifier) of the DM server 120 that performs the outward trap registration to determine appropriateness of the ServerID (S223). The appropriate ServerID needs to include information of the DM server 120 including the 'ServerID' in the DM account of the DM client 110 by the DM client 110's completing bootstrapping, and further, the appropriate ServerID needs to be the ServerID of the DM server 120 which may be authorized by using the authentication information included in the DM account. In addition, the appropriate ServerID needs to be the ServerID of the DM server that registers the outward trap at present.

In step S223, if there is no problem in registering the outward trap, the DM client 110 performs an actual registration process. That is, the DM server DMS1 is added below the node 'ToRef/TargetServer' as the child node (S224), and the 'ServerID' of the DM server 120 is stored and mapped with the outward trap registration (S225). Therefore, the DM client 110 may bring the 'ServerID' that performs the registration afterwards. As a result, the outward trap registration is succeeded (S226).

In step S223, if there is a problem in registering the outward trap, the outward trap registration is failed (S227). Therefore, the outward trap registration process is completed.

Referring to FIG. 11b, the DM server DMS1 receives an outer trap notification sent by the DM client 110 as the trap event occurs (S231). The received outward notification includes the identification information (ID) of the server that registers the trap event.

The DM server DMS1 determines whether the received trap event is valid (S232). To this end, the DM server DMS1 determines whether the trap event is valid through the 'ServerID' registering the outward trap included in the outward notification and the information on the outward trap event. That is, the DM server DMS1 may determine that the trap event is not valid in the case of a trap registered by a DM server 120 which has no trust relationship with the DMS1 or undesired trap event information.

In step S232, when the DM server DMS1 determines that the received trap event is valid, the DM server DMS1 processes the received trap event (S233).

In step S232, when the DM server DMS1 determines that the received trap event is not valid, the DM server DMS1 requests for cancellation of the corresponding event registration to the DM client 110 (S234).

The second embodiment of the present invention described above is a method that sends the trap event which is the sensitive information of the DM client 110 to only the trustable DM server 1120 and the second embodiment is a method that prevents the trap event of the DM client 110 from being transmitted to the DM server 120 that does not desire receiving the event. Both methods may be separately applied, but both methods may be simultaneously used. That is, when both methods are applied, the trap event may be prevented from being transmitted to the DM server 120 that does not desire receiving the trap event while the trap event is sent to the trustable DM server.

In the aforementioned embodiments, an examination process of the execution authority is added in addition to the Add authority assured by the ACL mechanism while registering the inward trap event. The checkation of the execution authority is not assured by the ACL mechanism. As such, examining the execution authority while registering the trap event is an independent part of the TrapMO which is not used in other management object (MO). Registration in a DM protocol is generally achieved by adding related information. Management objects (MOs) requiring the registration include a GwMO, an SCOMO, and the like.

In the GwMO, a representative case requiring the registration includes fanout command registration and image registration. Fanout is a scheme in which the DM server 120 sends the DM command to a DM gateway, and the DM gateway sends the DM command to all target end devices. That is, the DM server 120 transfers the DM command to the DM gateway only once to send the DM command to all target end devices, thereby effectively managing the end devices. In order to use the fanout, the DM server 120 needs to register the DM command to be used in the fanout in the DM gateway and this process is the fanout registration. The fanout registration is performed by adding a related sub-tree such as the DM command below 'Fanout/<x>' and in this case, it is just checked whether the DM server 120 that performs the registration has an authority to add the related sub-tree to 'Fanout/<x>'. Further, an image inventory function of the GwMO is a function that the DM server 120 stores image data such as a SW package in the DM gateway and allows the end device to refer to an image stored in the DM gateway. The image inventory function is more efficiently in that the image in the DM gateway may be repeatedly transferred to the end device than a case in which the remote DM server 120 sends the image to each end device. In order to perform the image inventory function, an image registration process needs to be performed. During this process, the DM server 120 adds a related image below '<x>/Images/<x>' of 'Image InventoryMO' to perform the registration and during this process, the Add authority assured by the ACL is also just checked.

Even in the SCOMO, a process of registering SW which may be downloaded to the end device is also similar and it is just checked that the DM server 120 has an authority to add a sub-tree below '<x>/Download/<x>' of the SCOMO.

It is assumed that the ACL may be dynamically changed while managing the end device in the embodiments of the present invention. An ACL property of a node is described in detail in Properties of Nodes of Section 7 in [OMA-DM-TND] and the corresponding document is incorporated in the specification as a reference. DM commands permitted by the ACL are getting and replacing, and this means that the DM server 120 may arbitrarily change the ACL value as necessary. A case in which the DM server 120 may change the ACL represents, for example, a case in which a permitted authority becomes extinct due to an advent of a time limit, and as a result, an authority of the corresponding DM server 120 is removed (in a case in which the DM server 120 is out of an enterprise domain, a management authority of the existing enterprise DM server 120 is withdrawn) or a case in which an unpermitted authority is newly granted to the corresponding DM server 120 according to a request (when the DM server 120 enters the enterprise domain, the management authority is entrusted to the corresponding enterprise DM server 120).

The ACL may be frequently during managing the end device due to such a cause and the present invention includes a method of reinforcing the inward trap security by reflecting the ACL to the inward trap security.

Figure 12:
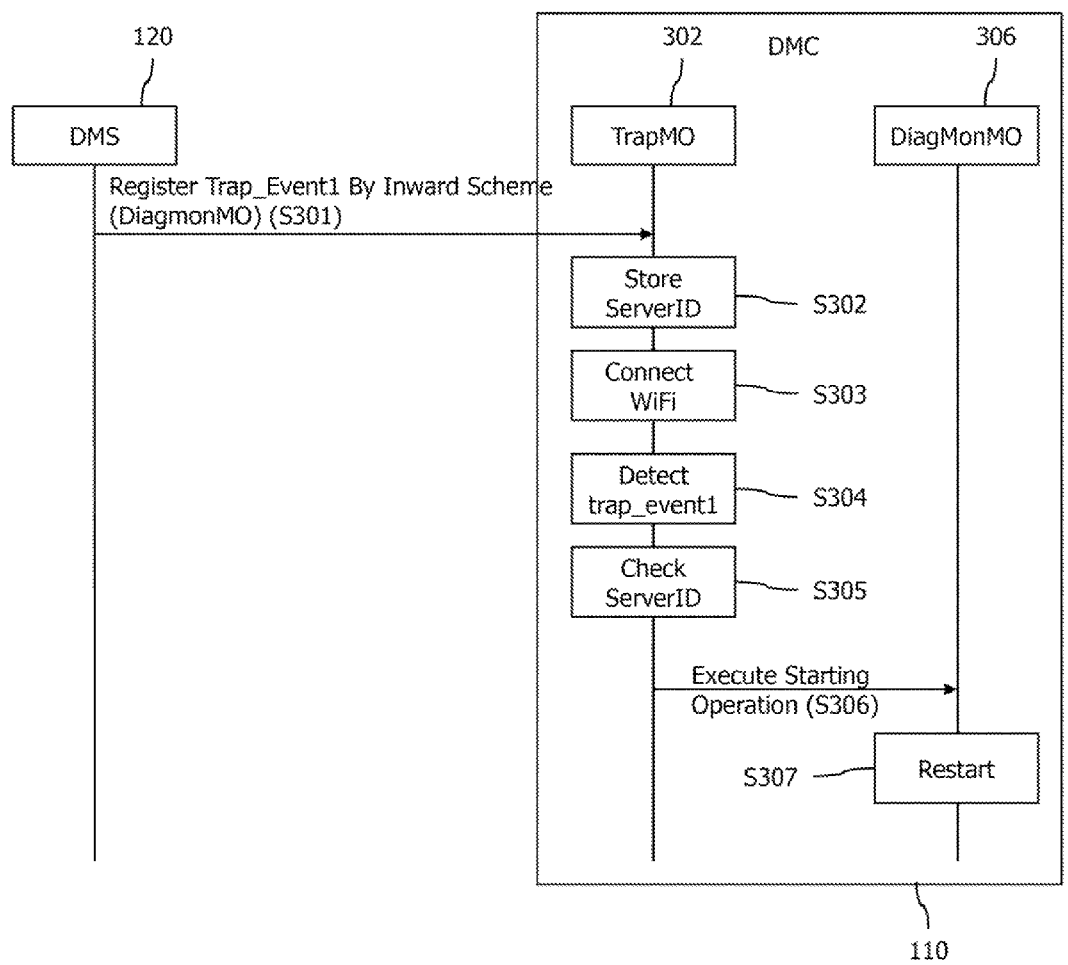
FIG. 12 is a flowchart illustrating an inward trap event registration process according to the first embodiment disclosed in the specification.

FIG. 12 is a flowchart illustrating an inward trap event registration process according to the first embodiment disclosed in the specification.

The DM client 110 receives the trap event registration request for monitoring the 'trap_event1' which is the trap event from the DM server 120 (S301). In this case, the DM server 120 registers the inward trap and sends a 'URI1' which is a command of an end device which will execute the command when the event 'trap_event1' occurs (in the embodiment, the 'trap_event1' is the event 'WiFi_Connected' and the 'URI1' is 'DiagMonMO/Restart/Operations/Start').

The DM client 110 receives the inward trap registration request from the DM server 120, and checks the authority to register the inward trap in the corresponding trap event which the DM server has and thereafter, performs the inward trap registration. The MD client 110 checks the 'ServerID' of the DM server 120 is correct (bootstrapped, the identifier of the DM server 120) through the DM account and stores the 'ServerID' in connection with the registration (S302).

The DM client 110 senses that the WiFi is connected (S303).

The DM client 110 senses that the 'trap_event1' occurs from the WiFi connection and prepares processing of the 'trap_event1' (S304).

The DM client 110 retrieves a URI registered as the inward trap and a ServerID mapped with the URI (S305). For example, the DM client 110 retrieves the TrapMO instance in which the TrapID is the 'trap_event1' by starting from a root of the TrapMO. Further, the DM client 110 retrieves 'TargetURI/<x>/URI' registered as the inward trap and retrieves the ServerID mapped with the URI, from the discovered TrapMO instance. The DM client 110 checks whether the ServerID is a correct server identifier through the DM account of the DM client 110. The DM client 110 checks whether the discovered ServerID has an execution authority for a node indicated by the URI.

The DM client 110 determines that only a ServerID that meets both conditions has an au authority for inward notification.

Since the ACL representing the execution authority Of the DM tree is the runtime property which may be changed while execution, the ACL which are dynamically changed may be reflected by the authority checking method according to the embodiments of the present invention.

In step S304, when it is checked that the ServerID has the authority for the inward notification, the DM client 110 sends the inward notification to the node indicated by the URI (S306). The DiagMonMO 306 restarts the executing work (S307).

Since multiple inward trap registrations may be achieved with respect to one trap event, the process returns to step S305 with respect to all registrations in this case.

Figure 13:
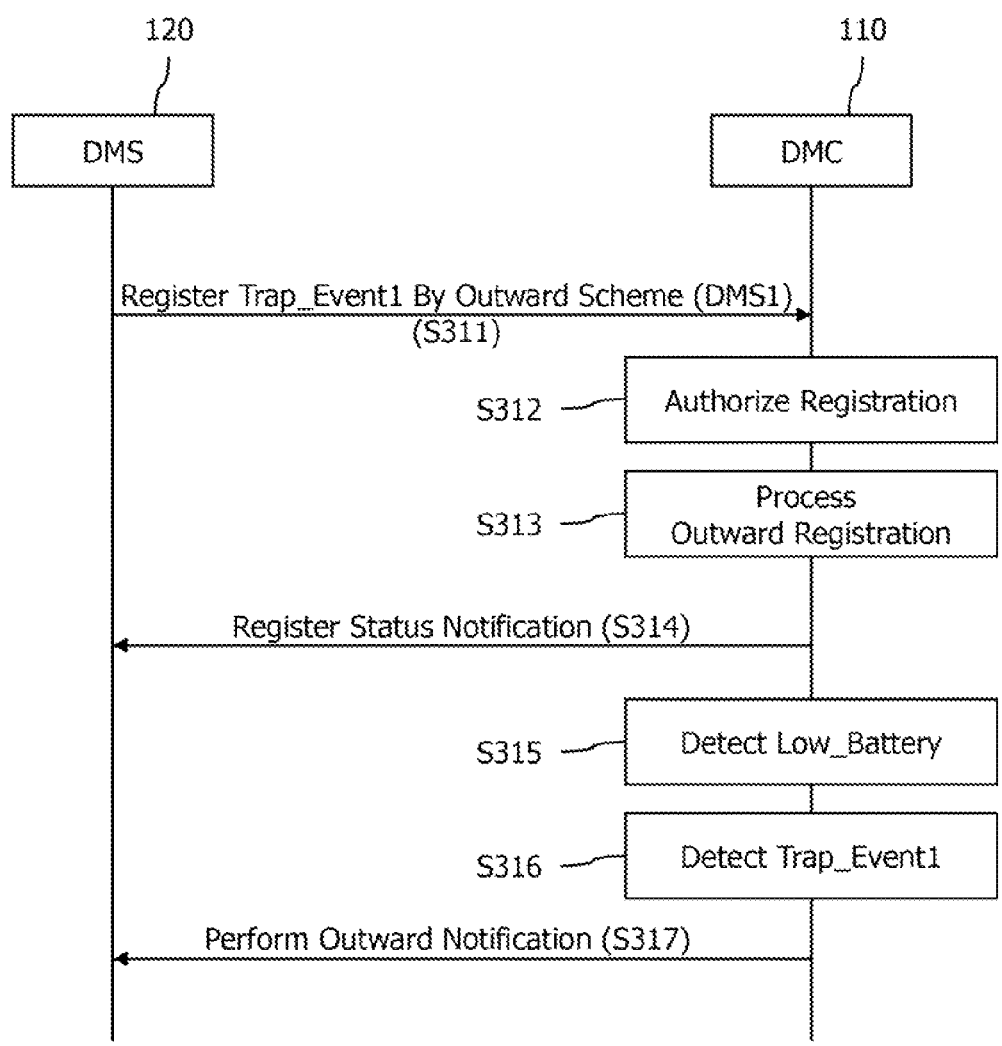
FIG. 13 is a flowchart illustrating a process of registering and notifying an outward trap event by using a DM account according to the second embodiment disclosed in the specification.

FIG. 13 is a flowchart illustrating a process of registering and notifying an outward trap event by using a DM account according to the second embodiment disclosed in the specification.

The DM client 110 receives the trap event registration request for monitoring the 'trap_event1' which is the trap event from the DM server 120 (S311). In this case, the DM server 120 registers the outward trap, and designates the DM server DMS1 to a server to which the event will be reported when the event 'trap_event1' occurs. In the above example, the 'trap_event1' is an event 'Low_Battery'.

The DM client 110 authorizes the outward trap registration received from the DM server 120 (S312). The DM client 110 checks whether the DM server DMS1 has a registration authority for the registration. Further, the DM client 110 checks whether the ServerID of the DMS server DMS1 is correct (bootstrapped and additionally, the identifier of the DM server 120) through the DM account. In this case, when the DM server DMS1 is not bootstrapped, bootstrapping may be additionally performed. If the DM server DMS1 does not have the registration authority or the bootstrapping is failed, the registration is failed.

When the DM client 110 successfully authorizes the outward trap registration of the DM server 120, the registration is performed (S313).

Additionally, the DM client 110 transmits an outward trap registration result to the DM server 120 (S314).

The DM client 110 senses the event 'Low_Battery' (S315).

The DM client 110 senses that the 'trap_event1' occurs from the event 'Low_Battery' sensed in step S315 and prepares processing of the 'trap_event1' (S316).

The DM client 110 transfers information related with the trap event 'trap_event1' to the DM server 120 (S317).

Figure 14:
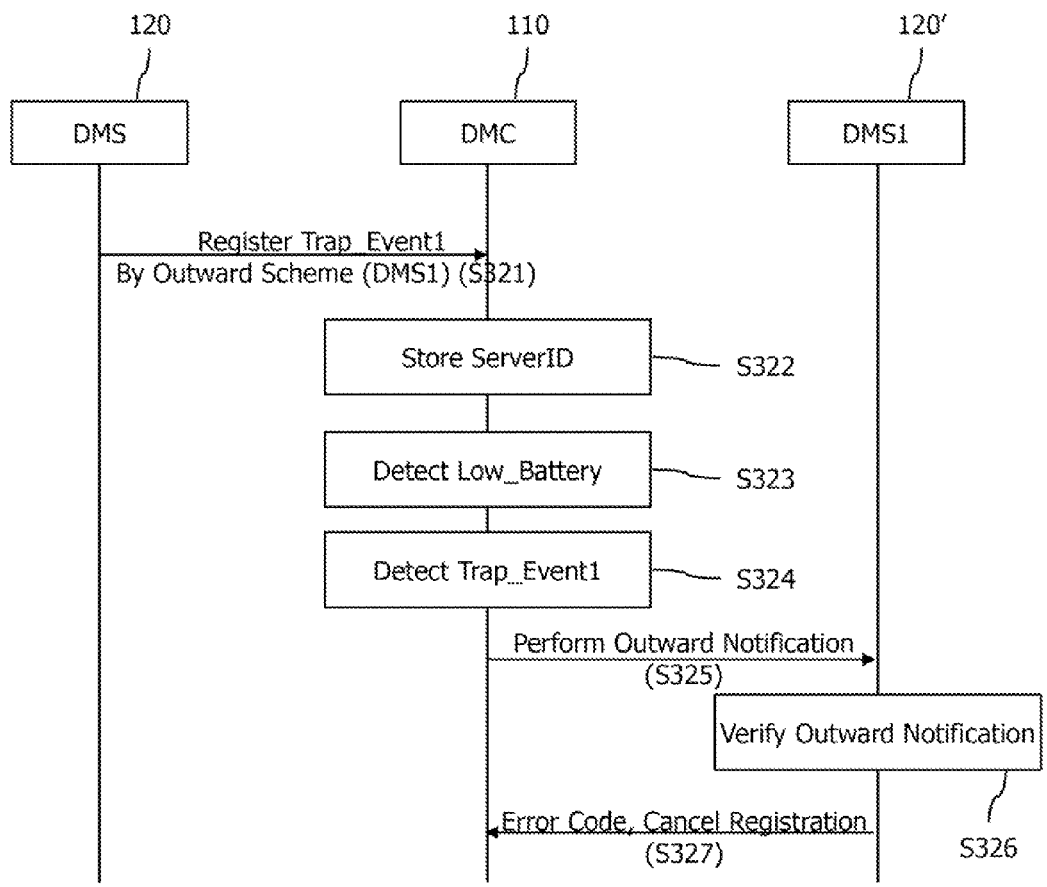
FIG. 14 is a flowchart illustrating a process of registering and notifying an outward trap event using an optimistic notification control according to a third embodiment disclosed in the specification.

FIG. 14 is a flowchart illustrating a process of registering and notifying an outward trap event using an optimistic notification control according to a third embodiment disclosed in the specification.

The DM client 110 receives the trap event registration request for monitoring the 'trap_event1' which is the trap event from the DM server 120 (S321). In this case, the DM server 120 registers the outward trap, and designates the DM server DMS1 to a server to which the event will be reported when the event 'trap_event1' occurs. In the above example, the 'trap_event1' is the event 'Low_Battery'.

The DM client 110 receives the inward trap registration request from the DM server 120, and checks whether the DM server DMS1 has the authority to perform the registration and thereafter, performs the corresponding registration (S322). Further, the DM client 110 checks the ServerID of the DM server 120 is correct through the DM account and stores the ServerID in connection with the registration. The correct ServerID is bootstrapped through the DM account and needs to be the server identifier of the DM server 120 that performs the registration. If the corresponding ServerID is an incorrect ServerID, the registration is failed.

The DM client 110 senses a 'Low_Battery' status in which a battery is decreased to a predetermined level or less (S323).

The DM client 110 senses that the 'trap_event1' occurs from the 'Low_Battery' status and prepares processing of the 'trap_event1' (S324).

The DM client 110 transfers the information related to the trap event 'trap_event1' and the ServerID stored in step S322 to the DM server DMS1 (S325).

The DM server DMS1 authorizes the outward trap registration from the information of the 'trap_event1' received from the DM client 110 and the information of the ServerID registering the outward trap (S326). The DM server DMS1 may verify the outward notification through itself and the server having the ServerID. If the outward notification is previously authorized, step S326 may be omitted and the same outward notification need not be duplicatively and continuously checked.

When the outward notification received by the DMS server DMS1 is not authorized, the DM server DMS1 transmits a request for cancelling the registration of the DM server DMS1 for the 'trap_event1' to the DMS client (S27).

Figure 15:
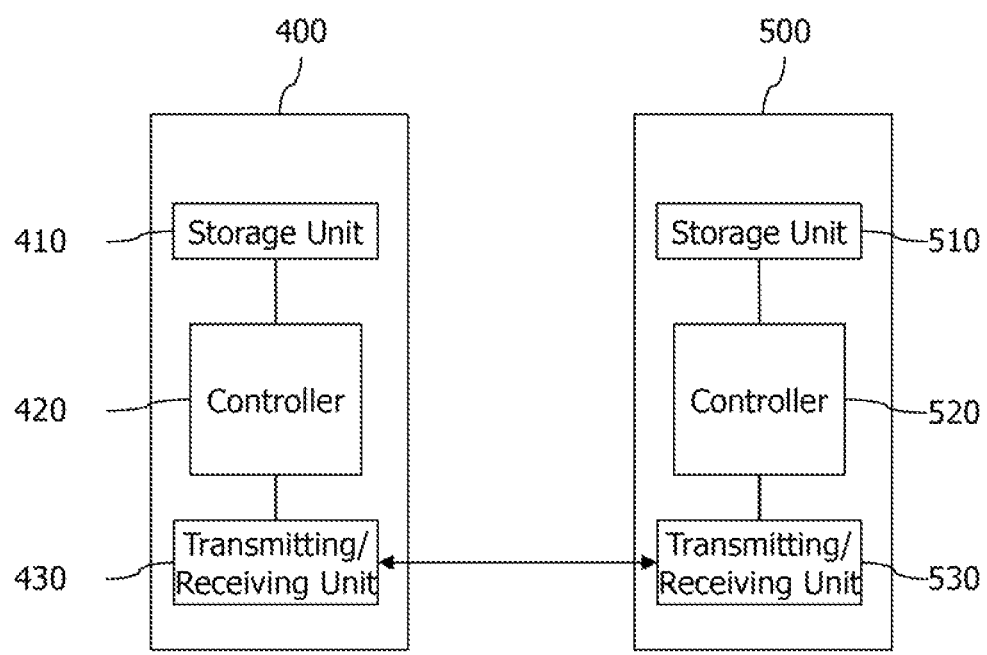
FIG. 15 is a block diagram of an end device 400 and a server 500 disclosed in the specification.

FIG. 15 is a block diagram of an end device 400 and a server 500 disclosed in the specification.

As illustrated in FIG. 15, an end device 400 includes storage means 410, a controller 420, and a transmitting/receiving unit 430. The storage means 410 stores the methods according to the embodiment illustrated in FIGS. 1 to 14. The controller 420 controls the storage means 410 and the transmitting/receiving unit 430. In detail, the controller 420 respectively executes the methods stored in the storage means 410. In addition, the controller 420 transmits the aforementioned signals through the transmitting/receiving unit 430.

Further, as illustrated in FIG. 15, a server 500 includes storage means 510, a controller 520, and a transmitting/receiving unit 530. The storage means 510 stores the methods according to the embodiment illustrated in FIGS. 1 to 14. The controller 520 controls the storage means 510 and the transmitting/receiving unit 530. In detail, the controller 520 respectively executes the methods stored in the storage means 510. In addition, the controller 520 transmits the aforementioned signals through the transmitting/receiving unit 530.

Accordingly, the exemplary embodiments described above are provided as examples in the whole respects and do not limit the present invention. While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

The invention claimed is:

1. A method for notifying a trap to other functional components of a device, the method performed by the device and comprising:
   receiving a trap registration request from a server,
   wherein the trap registration request includes a target URI including a server URI and a URI;
   checking whether the server has an Exec permission on an executable node pointed by the target URI;
   performing a registration by storing the server URI in the target URI if the server has the Exec permission on the executable node,
   wherein the trap includes an event to be monitored and is associated with a server identifier and a trap identifier;
   detecting the event;
   checking whether a server identified by the server URI has the Exec permission on the executable node; and
   notifying the trap to the executable node if the server identified by the server URI has the Exec permission on the executable node.

2. The method of claim 1, wherein the checking whether the server identified by the server URI has the Exec permission on the executable node is performed in addition to an ACL (Access Control List).

3. The method of claim 1, wherein the performing the registration comprises
   adding a sub-tree in the target URI.

4. The method of claim 3, wherein in the checking whether the server has the Exec permission on the executable node pointed by the target URI, it is further checked whether the server has an Add permission to create the sub-tree as well as the Exec permission.

5. The method of claim 1, further comprising:
   transmitting a message indicating a registration failure to the server if the server does not have the Exec permission on the executable node.

6. The method of claim 1, further comprising:
deregistering the trap if the server identified by the server URI does not have Exec permission on the executable node.

7. The method of claim 6, further comprising:
transmitting a message indicating that the trap has been deregistered to the server identified by the server URI.

8. A device for notifying a trap to other functional components, the device comprising
- a transceiver configured to receive a trap registration request from a server, wherein the trap registration request includes a target URI including a server URI and a URI; and
- a controller configured to check whether the server has an Exec permission on an executable node pointed by the target URI, and perform a registration by storing the server URI in the target URI if the server has the Exec permission on the executable node, wherein the trap includes an event to be monitored and is associated with a server identifier and a trap identifier, wherein the controller is further configured to detect the event and check whether a server identified by the server URI has the Exec permission on the executable node, and wherein the transceiver is further configured to notify the event to the executable node if the server identified by the server URI has the Exec permission on the executable node.

9. A method for controlling trap operation of a device for notifying the trap to a server, the method performed by the device and comprising:
receiving a trap registration request from a server;
checking whether the server has an authority to perform the trap registration request; and
performing a registration if the server has the authority.

10. The method of claim 9, further comprising:
transmitting a message indicating a registration failure to the server which has transmitted the trap registration request if the server does not have the authority.

11. A device for notifying a trap to a server, the device comprising:
- a transceiver configured to receive a trap registration request from a server; and
- a controller configured to check whether the server has an authority to perform the trap registration request and perform a registration if the server does have the authority.

* * * * *